(12) United States Patent
Nixon et al.

(10) Patent No.: US 9,880,540 B2
(45) Date of Patent: Jan. 30, 2018

(54) MARKUP LANGUAGE-BASED, DYNAMIC PROCESS GRAPHICS IN A PROCESS PLANT USER INTERFACE

(75) Inventors: Mark J. Nixon, Round Rock, TX (US); Tennyson Hao, Quezon (PH); Francis De Guzman, Antipolo (PH); Richard Rodriguez, Quezon (PH); Ryan Valderama, Pasig (PH); J. Michael Lucas, Leicester (GB); Ken J. Beoughter, Round Rock, TX (US); Stephen Gilbert, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 1294 days.

(21) Appl. No.: 10/590,550

(22) PCT Filed: May 4, 2005

(86) PCT No.: PCT/US2005/015941
§ 371 (c)(1),
(2), (4) Date: Aug. 22, 2006

(87) PCT Pub. No.: WO2005/109129
PCT Pub. Date: Nov. 17, 2005

(65) Prior Publication Data
US 2007/0168060 A1 Jul. 19, 2007

Related U.S. Application Data

(60) Provisional application No. 60/567,980, filed on May 4, 2004.

(51) Int. Cl.
*G06F 3/048* (2013.01)
*G05B 19/042* (2006.01)
(Continued)

(52) U.S. Cl.
CPC ... *G05B 19/0426* (2013.01); *G05B 19/41885* (2013.01); *G05B 23/0267* (2013.01);
(Continued)

(58) Field of Classification Search
USPC .................................. 700/17, 83; 715/764
See application file for complete search history.

(56) References Cited

U.S. PATENT DOCUMENTS 5,006,992 A * 4/1991 Skeirik ................ G05B 13/028
700/47
5,168,441 A * 12/1992 Onarheim et al. ............... 700/17
(Continued)

FOREIGN PATENT DOCUMENTS

DE 3751192 10/1995
EP 0813129 12/1997
(Continued)

OTHER PUBLICATIONS

"Vector graphics", taken from http://en.wikipedia.org/wiki/Vector_graphics, published Apr. 2004.*
(Continued)

*Primary Examiner* — William Bashore
*Assistant Examiner* — Gregory A Distefano
(74) *Attorney, Agent, or Firm* — Marshall, Gerstein & Borun LLP

(57) ABSTRACT

A user interface system for a process plant includes a graphic display editor to configure a process graphic display having a graphic display element representative of a process plant element of the process plant. The process graphic display is specified via configuration information set forth in a declarative language. A graphics rendering engine generates a depiction of the process graphic display during runtime based on commands derived from the configuration information set forth in the declarative language. The configu-
(Continued)

ration information for the process graphic display may be stored as an object, which, for instance, may include first and second portions to define a graphical parameter and identify a data source, respectively. The graphical parameter may be directed to defining a graphical depiction of the process plant element and, to this end, may be set forth in a formal in accordance with the declarative language. The data source may specify a location or path for data indicative of on-line operation of the process plant element to be displayed via the graphical depiction.

24 Claims, 20 Drawing Sheets

(51) Int. Cl.
| | | |
|---|---|---|
| *G05B 19/418* | (2006.01) | |
| *G05B 23/02* | (2006.01) | |
| *G06F 9/44* | (2006.01) | |
| *G06N 5/04* | (2006.01) | |
| *G06Q 10/06* | (2012.01) | |
| *G06Q 50/04* | (2012.01) | |
| *H04L 29/08* | (2006.01) | |
| *G06T 13/00* | (2011.01) | |
| *H04L 12/40* | (2006.01) | |

(52) U.S. Cl.
CPC .......... *G06F 8/20* (2013.01); *G06F 8/38* (2013.01); *G06F 9/4428* (2013.01); *G06F 9/4443* (2013.01); *G06N 5/04* (2013.01); *G06Q 10/06* (2013.01); *G06Q 50/04* (2013.01); *G06T 13/00* (2013.01); *H04L 67/12* (2013.01); *H04L 67/16* (2013.01); *H04L 67/28* (2013.01); *H04L 67/289* (2013.01); *H04L 67/36* (2013.01); *G05B 2219/23424* (2013.01); *G05B 2219/25067* (2013.01); *G05B 2219/25428* (2013.01); *G05B 2219/31467* (2013.01); *G05B 2219/31469* (2013.01); *G05B 2219/31472* (2013.01); *G05B 2219/31474* (2013.01); *G05B 2219/32128* (2013.01); *G05B 2219/32342* (2013.01); *H04L 2012/4026* (2013.01); *Y02P 90/14* (2015.11); *Y02P 90/26* (2015.11); *Y02P 90/265* (2015.11); *Y02P 90/30* (2015.11); *Y02P 90/84* (2015.11); *Y10S 715/965* (2013.01)

(56) References Cited

U.S. PATENT DOCUMENTS

| | | | |
|---|---|---|---|
| 5,421,017 A | 5/1995 | Scholz et al. | |
| 5,526,268 A * | 6/1996 | Tkacs ................ | G05B 23/0267 704/8 |
| 5,611,059 A | 3/1997 | Benton et al. | |
| 5,631,825 A | 5/1997 | van Weele et al. | |
| 5,680,409 A | 10/1997 | Qin et al. | |
| 5,706,455 A | 1/1998 | Benton et al. | |
| 5,734,863 A * | 3/1998 | Kodosky ............ | G06F 11/3664 703/27 |
| 5,812,394 A * | 9/1998 | Lewis ................ | G05B 19/0426 700/17 |
| 5,818,736 A * | 10/1998 | Leibold ............. | G05B 13/0265 703/16 |
| 5,841,654 A | 11/1998 | Verissimo et al. | |
| 5,862,052 A | 1/1999 | Nixon et al. | |
| 5,883,639 A * | 3/1999 | Walton ............... | G06T 1/00 345/473 |
| 5,892,939 A * | 4/1999 | Call et al. ........ | 703/23 |
| 5,909,368 A * | 6/1999 | Nixon et al. ........ | 700/2 |
| 5,926,177 A | 7/1999 | Hatanaka et al. | |
| 5,950,006 A | 9/1999 | Crater et al. | |
| 6,173,208 B1 * | 1/2001 | Park et al. ........ | 700/83 |
| 6,192,390 B1 | 2/2001 | Berger et al. | |
| 6,268,853 B1 * | 7/2001 | Hoskins et al. ........ | 700/83 |
| 6,289,299 B1 * | 9/2001 | Daniel, Jr. ........ | G05B 23/0267 345/419 |
| 6,362,839 B1 | 3/2002 | Hamilton et al. | |
| 6,385,496 B1 | 5/2002 | Irwin et al. | |
| 6,396,516 B1 | 5/2002 | Beatty | |
| 6,442,512 B1 * | 8/2002 | Sengupta et al. ........ | 703/6 |
| 6,445,963 B1 | 9/2002 | Blevins et al. | |
| 6,571,133 B1 | 5/2003 | Mandl et al. | |
| 6,587,108 B1 | 7/2003 | Guerlain et al. | |
| 6,618,630 B1 | 9/2003 | Jundt et al. | |
| 6,633,782 B1 | 10/2003 | Schleiss et al. | |
| 6,691,280 B1 | 2/2004 | Dove et al. | |
| 6,813,532 B2 * | 11/2004 | Eryurek ............ | G05B 13/0275 700/108 |
| 7,165,226 B2 * | 1/2007 | Thurner et al. ........ | 715/767 |
| 7,515,977 B2 * | 4/2009 | Eryurek et al. ........ | 700/83 |
| 7,707,550 B2 * | 4/2010 | Resnick et al. ........ | 717/121 |
| 2002/0019672 A1 * | 2/2002 | Paunonen ............. | 700/17 |
| 2002/0022894 A1 | 2/2002 | Eryurek et al. | |
| 2002/0022895 A1 * | 2/2002 | Genise et al. ........ | 700/83 |
| 2002/0046290 A1 | 4/2002 | Andersson et al. | |
| 2002/0054101 A1 | 5/2002 | Beatty | |
| 2002/0055790 A1 | 5/2002 | Havekost | |
| 2002/0077711 A1 | 6/2002 | Nixon et al. | |
| 2002/0101431 A1 * | 8/2002 | Forney ............. | G06F 17/30873 345/582 |
| 2002/0120921 A1 | 8/2002 | Coburn et al. | |
| 2002/0193888 A1 | 12/2002 | Wewalaarachchi et al. | |
| 2002/0199123 A1 | 12/2002 | McIntyre et al. | |
| 2003/0014500 A1 | 1/2003 | Schleiss et al. | |
| 2003/0028269 A1 | 2/2003 | Spriggs et al. | |
| 2003/0139837 A1 * | 7/2003 | Marr .................. | G05B 23/0278 700/110 |
| 2003/0153988 A1 | 8/2003 | Shepard et al. | |
| 2003/0191803 A1 | 10/2003 | Chinnici et al. | |
| 2003/0236576 A1 | 12/2003 | Resnick et al. | |
| 2004/0075689 A1 * | 4/2004 | Schleiss ............. | G05B 15/02 715/771 |
| 2004/0153804 A1 * | 8/2004 | Blevins et al. ........ | 714/33 |
| 2004/0199925 A1 * | 10/2004 | Nixon et al. ........ | 719/315 |
| 2005/0005079 A1 | 1/2005 | Boudou et al. | |
| 2005/0039034 A1 | 2/2005 | Doyle et al. | |
| 2005/0197803 A1 | 9/2005 | Eryurek et al. | |
| 2005/0197805 A1 | 9/2005 | Eryurek et al. | |
| 2005/0197806 A1 | 9/2005 | Eryurek et al. | |
| 2005/0222698 A1 | 10/2005 | Eryurek et al. | |
| 2007/0132779 A1 * | 6/2007 | Gilbert et al. ........ | 345/619 |

FOREIGN PATENT DOCUMENTS

| | | |
|---|---|---|
| EP | 1122652 | 8/2001 |
| GB | 2349958 | 11/2000 |
| GB | 2372365 | 8/2002 |
| JP | 07-182390 | 7/1995 |
| JP | 10-187425 | 7/1998 |
| JP | 2004094803 A | 3/2004 |
| JP | 2004127242 A | 4/2004 |
| WO | WO-95/04314 | 2/1995 |
| WO | WO-00/70531 | 11/2000 |
| WO | WO-01/67192 | 9/2001 |
| WO | WO-02/071169 | 9/2002 |
| WO | WO-03/048922 | 6/2003 |
| WO | WO-03/075206 | 9/2003 |
| WO | WO-05/107409 | 11/2005 |
| WO | WO-05/107410 | 11/2005 |
| WO | WO-05/107416 | 11/2005 |
| WO | WO-05/109122 | 11/2005 |
| WO | WO-05/109123 | 11/2005 |
| WO | WO-05/109124 | 11/2005 |
| WO | WO-05/109125 | 11/2005 |
| WO | WO-05/109126 | 11/2005 |
| WO | WO-05/109128 | 11/2005 |
| WO | WO-05/109129 | 11/2005 |

(56) References Cited

FOREIGN PATENT DOCUMENTS

| WO | WO-05/109130 | 11/2005 |
|----|--------------|---------|
| WO | WO-05/109131 | 11/2005 |
| WO | WO-05/109250 | 11/2005 |

OTHER PUBLICATIONS

Examination Report under Section 18(3) for Application No. GB0621390.4, dated Jul. 10, 2009.
Notification of Second Office Action for Chinese Application No. 200580014538.7, dated Jun. 19, 2009.
Examination Report under Section 18(3) for Application No. GB0621390.4, dated Jan. 29, 2010.
European Office Action for Application No. 05745149.4-2206 / 1751631, dated Apr. 6, 2009.
European Office Action for Application No. 05 745 149.4-2206, dated Jan. 21, 2008.
Janos Sztipanovits et al. "Modeling, Model, Interpretation and Intelligent Control" (1989) (pp. 46-50).
Philippine Office Action for Application No. 1-2006-502111, dated Jul. 15, 2010.
Arzen, "Using Real-Time Expert Systems for Control System Prototyping," *Proceedings of the International Conference on Systems, Man and Cybernetics*, 3:25-30 1993.
CAMO product datasheet, "The Unscrambler 9.7," http://www.camo.com/downloads/products/The_Unscrambler.pdf.
Developers.sun.com, "Core J2EE Patterns—Data Access Object," Core J2EE Pattern Catalog (2004). Retrieved from the Internet on Sep. 25, 2007: <URL: http://java.sun.com/blueprints/corej2eepatterns/Patterns/DataAccessObject.html.
European Office Action for Application No. 05 745 49.9-2206, dated Mar. 16, 2007.
Foldoc, "Declarative Language," Retrieved from the Internet on Jul. 30, 2007: URLhttp://ftp.sunset.se/foldoc/foldoc.cgi?declarative+language.
Han et al., "Web Based rSPC (realtime Statistical Process Control) System Supporting XML Protoccol," ISIE, vol. 1, pp. 399-403 (2001).
International Preliminary Report on Patentability for International Application No. PCT/US2005/015941, dated Nov. 7, 2006.
International Search Report for International Application No. PCT/US2005/015941, dated Aug. 29, 2005.
Kurpis, "The New IEEE Standard Dictionary of Electrical and Electronics Terms (Including Abstracts of All Current IEEE Standards)," Fifth Ed., Christopher J. Booth, Editor, pp. 317 (1993).
Mehta et al., "Feedfoward Neural Networks for Process Identification and Prediction," Neural Network and Exert Systems Presentation (2001).
Mohr et al., "BizTalk and Application Integration—Translating Between Message Specification: BizTalk Mapper," Professional BizTalk, Chapter 4, pp. 38-40 (2001).
MSDN Magazine, "A First Look at Writing and Deploying Apps in the Next Generation of Windows," Retrieved from the Internet on Aug. 21, 2007: URL http://msdn.microsoft.com/msdnmag/issues/04/01/DevelopingAppsforLonghorn/?print=true.
MSDN Magazine, "Create Real Apps Using New Code and Markup Model," Retrieved from the Internet on Aug. 21, 2007: URL http://msdn.microsoft.com/msdnmag/issues/04/01/avalon/?print=true.
OPC Foundation, "What is OPC?" Retrieved from the Internet on Aug. 21, 2007: URL http://www.opcfoundation.org/Default.aspx/01_about/01_whatis.asp?MID=AboutOPC.
StatSoft product datasheet, "Statistica, Multivariate Statistical Process Control," http://www.statsoft.com/downloads/brochures/pdf/MSPC.pdf.
Tzovla et al., "Abnormal Condition Management Using Expert Systems," Neural Network and Exert Systems Presentation (2001).
Umetrics product datasheet, "SIMCA-P 11" and "SIMCA-P+ 11," http://www.umetrics.com/pdfs/brochures/6049_SIMCA-P_11_ProdSpec.pdf.
W3C, "XSL Transformations (XSLT)," W3C Recommendation (1999), http://www.w3.org/TR/xslt/.
Wikipedia, "Application Programming Interface," Retrieved from the Internet on Aug. 21, 2007: URL http://en.wikipedia.org/wiki/Application_programming_interface.
Wikipedia, "Class (computer science)," Retrieved from the Internet on Aug. 21, 2007: URL http://en.wikipedia.org/wiki/Class_(computer_science).
Wikipedia, "Extensible Application Markup Language," Retrieved from the Internet on Jul. 30, 2007: URL http://en.wikipedia.org/wiki/Extensible_Application_Markup_Language.
Wikipedia, "Vector Graphics," Retrieved from the Interent on Aug. 21, 2007: URL http://en.wikipedia.org/wiki/Vector_graphics.
Japanese Office Action for Application No. 2007-511655, dated Feb. 21, 2012.
Decision of Rejection for Chinese Application No. 200580014283.4, dated Aug. 3, 2012.
International Preliminary Report on Patentablility for Application No. PCT/US2005/015393, dated Nov. 7, 2006.
Written Opinion for Application No. PCT/US2005/015393, dated Dec. 7, 2005.
Office Action for corresponding Chinese application No. 201110021358.9 dated Oct. 29, 2012.
Office Action in DE Application No. 10 2005 001 030.9 dated Nov. 16, 2015, 22 pages.
Office Action in DE Application No. 10 2005 001 043.0 dated Nov. 19, 2015, 27 pages.
Office Action for Japanese Application No. 2012-086181, dated May 22, 2015.

\* cited by examiner

MARKUP LANGUAGE-BASED, DYNAMIC PROCESS GRAPHICS IN A PROCESS PLANT USER INTERFACE

RELATED APPLICATIONS

This application is a regular filed application of, and claims, for the purposes of priority, the benefit of U.S. Provisional Application Ser. No. 60/567,980, entitled "Graphical User Interface for Representing, Monitoring, and Interacting with Process Control Systems," which was filed on May 4, 2004, and which this application hereby expressly incorporates by reference herein in its entirety. This application is also related to U.S. patent application Ser. No. 10/625,481, entitled "Integration of Graphic Display Elements, Process Modules and Control Modules in Process Plants," which was filed on Jul. 21, 2003, and which published as U.S. Publication No. 2004/0153804 on Aug. 5, 2004, which, in turn, is a Continuation-in-Part of U.S. patent application Ser. No. 10/278,469, entitled "Smart Process Modules and Objects in Process Plants," which was filed on Oct. 22, 2002, and which published as U.S. Publication No. 2004/0075689 on Apr. 22, 2004, the entire disclosures of which are hereby expressly incorporated by reference herein in their entirety. This application is also related to U.S. patent application Ser. No. 10/368,151 entitled "Module Class Objects in a Process Plant Configuration System," which was filed on Feb. 18, 2003, and which published as U.S. Publication No. 2004/0199925 on Oct. 7, 2004, the entire disclosure of which is hereby expressly incorporated by reference herein in its entirety. This application is also related to the following patent applications, which are being filed as International (PCT) applications on the same date as this application and which this application hereby expressly incorporates by reference herein in their entirety: "Associated Graphic Displays in a Process Environment" PCT/US05/15943; "User Configurable Alarms and Alarm Trending for Process Control Systems" PCT/US05/15537; "Integration of Process Modules and Expert Systems in Process Plants" PCT/US05/15556; "A Process Plant User Interface System Having Customized Process Graphic Display Layers in an Integrated Environment" PCT/US05/15392; "Scripted Graphics in a Process Environment" PCT/US05/15942; "Graphics Integration into a Process Configuration and Control Environment" PCT/US05/15588; "Graphic Element with Multiple Visualizations in a Process Environment" PCT/US05/15390; "System for Configuring Graphic Display Elements and Process Modules in Process Plants" PCT/US05/15391; "Graphic Display Configuration Framework for Unified Process Control System Interface" PCT/US05/15393; "Methods and Apparatus for Modifying Process Control Data" PCT/US05/15596; "Methods and Apparatus for Accessing Process Control Data" PCT/US05/15585; "Integrated Graphical Runtime Interface for Process Control Systems" PCT/US05/15439; "Service-Oriented Architecture for Process Control Systems" PCT/US05/15394.

TECHNICAL FIELD

The present invention relates generally to process plants and, more particularly, to process plant user interfaces having dynamic, integrated process graphics.

DESCRIPTION OF THE RELATED ART

Distributed process control systems, like those used in chemical, petroleum or other processes, typically include one or more process controllers communicatively coupled to one or more field devices via analog, digital or combined analog/digital buses. The field devices, which may be, for example, valves, valve positioners, switches and transmitters (e.g., temperature, pressure, level and flow rate sensors), are located within the process environment and perform process functions such as opening or closing valves, measuring process parameters, etc. Smart field devices, such as the field devices conforming to the well-known Fieldbus protocol, may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART and Fieldbus field devices. The control modules in the controller send the control signals over the communication lines to the field devices to thereby control the operation of the process.

Information from the field devices and the controller is usually made available over a data highway to one or more other hardware devices, such as operator workstations, personal computers, data historians, report generators, centralized databases, etc., typically placed in control rooms or other locations away from the harsher plant environment. These hardware devices run applications that may, for example, enable an operator to perform functions with respect to the process, such as changing settings of the process control routine, modifying the operation of the control modules within the controller or the field devices, viewing the current state of the process, viewing alarms generated by field devices and controllers, simulating the operation of the process for the purpose of training personnel or testing the process control software, keeping and updating a configuration database, etc.

As an example, the DeltaV™ control system, sold by Emerson Process Management includes multiple applications stored within and executed by different devices located at diverse places within a process plant. A configuration application, which resides in one or more operator workstations, enables users to create or change process control modules and download these process control modules via a data highway to dedicated distributed controllers. Typically, these control modules are made up of communicatively interconnected function blocks, which are objects in an object oriented programming protocol, which perform functions within the control scheme based on inputs thereto and which provide outputs to other function blocks within the control scheme. The configuration application may also allow a designer to create or change operator interfaces which are used by a viewing application to display data to an operator and to enable the operator to change settings, such as set points, within the process control routine. Each dedicated controller and, in some cases, field devices, stores and executes a controller application that runs the control modules assigned and downloaded thereto to implement actual process control functionality. The viewing applications, which may be run on one or more operator workstations, receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As the number and type of control and support applications used in a process control environment have increased, different graphical display applications have been provided to enable users to effectively configure and use these applications. For example, graphical display applications have been used to support control configuration applications to enable a configuration engineer to graphically create control programs to be downloaded to the control devices within a process plant. Additionally, graphical display applications have been used to enable control operators to view the current functioning of the process plant, or areas of the process plant, to enable maintenance personnel to view the state of hardware devices within the process plant, to enable simulation of the process plant, etc. However, these graphical display applications have, in the past, been created as part of, or to support, the specific applications with which they are associated, and thus are generally limited in usefulness to the specific process function for which they were created. For example, it is difficult, if not impossible, to use a graphical program created to support a control operator in a maintenance, configuration or simulation function.

Some process control configuration applications presently include a library of template objects, such as function block template objects and, in some cases, control module template objects, which are used to create a control strategy for a process plant. The template objects have default properties, settings and methods associated therewith and the engineer using a graphical configuration application can select these template objects and essentially place copies of the selected template objects into a configuration screen to develop a control module. During the process of selecting and placing the template objects into the configuration screen, the engineer interconnects the inputs and outputs of these objects and changes their parameters, names, tags and other properties to create a specific control module for a specific use in the process plant. The engineer can then instantiate the control module and download it to the appropriate controller or controllers and field devices for execution during operation of the process plant.

Thereafter, the engineer may use a different graphical display creation application to create one or more separate displays for operators, maintenance personnel, etc. within the process plant by selecting and building display objects in the display creation application. These displays are typically implemented on a system wide basis in one or more of the workstations, which provide the preconfigured displays to the operator or maintenance persons regarding the operating state of the control system or the devices within the plant. These displays generally take the form of alarming displays that receive and display alarms generated by controllers or devices within the process plant, control displays indicating the operating state of the controllers and other devices within the process plant, maintenance displays indicating the functioning state of the devices within the process plant, etc. However, these displays are generally preconfigured to display, in known manners, information or data received from the process control modules or the devices within the process plant. In some known systems, displays are created through the use of objects that have a graphic associated with a physical or logical element and that is communicatively tied to the physical or logical element to receive data about the physical or logical element. The object may change the graphic on the display screen based on the received data to illustrate, for example, that a tank is half full, to illustrate the flow measured by a flow sensor, etc. However, these graphical displays used for configuration, operator control, maintenance and simulation activities are generally created separately from one another using different graphical editors.

Thus, similar to the control configuration application, the display creation application may have template graphical display items, such as tanks, valves, sensors, operator control buttons like slide bars, on/off switches, etc. which may be placed on a screen in any desired configuration to create an operator display, maintenance display and the like. When placed onto the screen, individual graphic items may be interconnected on the screen in a manner that provides some information or display of the inner-workings of the process plant to users. However, to animate the graphic display, the display creator must manually tie each of the graphical items to data generated within the process plant, such as data measured by sensors or indicative of valve positions, etc. by specifying a communication link between the graphic item and the relevant data source within the process plant. This process is tedious, time consuming and maybe fraught with error.

While the control template objects within the control configuration application and the display items within the display creation application are convenient because they can be copied and used to create many different control modules and graphical displays, there is often a need to create numerous of the same control module and graphical display for different equipment within the process plant. For example, many medium to large sized process plants have numerous instances of the same or similar equipment that can be controlled and viewed using the same basic general control module and display. To create these numerous control modules and displays, however, a general control module or display module is created and this general control or display module is then copied for each of the different pieces of equipment for which it is applicable. Of course, after being copied, each of the new control or display modules must be manually altered in the configuration application to specify the particular equipment to which it is attached and all of these control and display modules must then be instantiated and downloaded to the process control system.

Unfortunately, the control modules and displays items discussed above are typically not modular. Thus, after being copied, each of the control modules and displays must be manually and individually altered using the appropriate configuration application to specify the equipment within the plant to which they are to be associated. In a plant having many copies of the same type of equipment (i.e., replicated equipment), this process is tedious, time consuming and fraught with operator introduced errors. Still further, once programmed, these different control modules and displays are not aware of each other. Therefore, to make a change to the control modules once created, the engineer or operator must manually make the same change to each of the different control modules for the different replicated equipment which, again, is time consuming and tedious. The same problem applies for the graphical views created for the different sets of replicated equipment within the plant. In other words, once a specific control module or a specific graphical view is created (individually or by being copied from a template object) and is then tied to a particular set of equipment within the plant, this control module or graphical view exists as a separate entity or object within the system without any automatic awareness of the other control modules or graphical displays that are the same or similar to it. As a result, changes applicable to every one of the control modules and graphical displays of a particular type must be made individually on those modules and displays. This problem is even more evident when graphical views are created for the same equipment but in different functional contexts within the plant, such as for control viewing, maintenance viewing and simulation functions. In this case, the graphical views are created separately without any knowledge or awareness of one another.

Thus, while graphic displays have been provided in and associated with different applications used for different general activities performed within a process plant, these graphic displays and associated graphic display editors were generally added on at the functional level of the application for which they were created to support. As a result, the graphical editors, to the extent they existed, have only enabled the user to create graphics that support specific functionality needed by a specific application. Previous process plants did not provide a graphical display editor that could be used by or that could support the graphical needs of various or multiple activities being performed in the context of plant configuration and support. Thus, for example, a graphical display editor used to support or enable control configuration activities only enabled the user to create control programs and did not support the needs or functionality of operator or maintenance displays. Similarly, graphic display editors used for creating operator views, maintenance views, etc. to be provided to a control operator or maintenance technician during operation of a plant, did not support functionality associated with configuration activities, simulation activities, etc. As a result of the graphic display needs being supported at the individual functional levels of the process plant, such as at the control configuration, maintenance support, control operator support and simulation support functional levels, different ones of the displays created by these various editors end up modeling and depicting the same components within the plant, which results in the duplication of graphical display efforts by various different personnel with the process plant. This duplication of effort is manifested not only in the effort needed to create the different graphical displays depicting the same process element for different uses, but also in the effort needed to tie the graphical elements used in different display applications to the actual hardware or software elements within the process plant to which they are associated.

Because graphical support for various process plant activities has been provided after the fact, and as part of the actual activity being performed, graphical support is not integrated in the plant environment in a manner that enables common graphics to be created and used within the plant at the various different functional levels of the plant. This non-integration of graphics leads to the graphics actually created for the different functions being different from function to function or from application to application, which can lead to confusion on the part of users who, while familiar with one specific type of graphical display, might occasionally need to view different displays associated with different operations or functions within the plant. Likewise, as noted above, the provision of graphical display support at the various different functional levels of the plant leads to the duplication of graphic support, both in creating displays and properly connecting the elements within the displays to actual hardware or software elements within the plant.

Additionally, error detection and other programming is useful for detecting conditions, errors, alarms, etc. associated with control loops running on the different controllers and problems within the individual devices. Such error detection has traditionally been performed at the different functional levels of the process plant and has been displayed on graphic displays created for those different functional activities. It has been difficult, therefore, to program the process control system to recognize system-level conditions or errors that must be detected by analyzing data from different, possible diversely located devices within the process plant and even more difficult to show these types of errors on operator displays that have not been created to indicate or present such system-level condition information to operators or maintenance personnel. Also, it is difficult to animate objects within operator displays with these alternate sources of information or data for the different elements within the display.

SUMMARY

In accordance with one aspect of the disclosure, disclosed is a user interface system for a process plant. The user interface system includes a computer-readable medium, and a graphic display editor to configure a process graphic display having a graphic display element representative of a process plant element of the process plant. Configuration information for the process graphic display generated by the graphic display editor is stored in the computer-readable medium in accordance with a declarative language. The user interface system further includes a graphics rendering engine to generate a depiction of the process graphic display during runtime based on commands derived from the configuration information.

The declarative language may define an extensible format for expressing the configuration information. Alternatively, or in addition, the configuration information may be stored in accordance with an object model framework based on the declarative language. The object model framework may define primitive shape objects made available by the graphic display editor to configure the process graphic display to include an additional graphic display element constructed from the primitive shape objects. The object model framework may also or alternatively define a composite object made available by the graphic display editor to configure the process graphic display to include an additional graphic display element constructed from the composite object. The graphic display editor may include graphical editing tools to create the composite object from previously constructed process model objects stored in the computer-readable medium. The graphical editing tools may also be defined via the object model framework.

In some embodiments, the declarative language is an extensible markup language. The declarative language may also or alternatively define an XML-based format for describing the configuration information.

The user interface system may also include a conversion engine, program or other tool to generate the commands in accordance with a further declarative language based on graphics-related information of the configuration information. The further declarative language may, in certain cases, set forth the graphics-related language in accordance with a vector graphics format. The conversion engine may also or alternatively generate further commands specifying a data conversion routine for the graphic display element. The conversion engine may still further generate a data source reference file from the configuration information for the process graphic display that identifies a data source for data to be displayed in connection with the graphic display element.

In accordance with another aspect of the disclosure, disclosed is an object entity stored in a computer-readable medium for use with a user interface system for a process plant. The object entity includes first and second portions. The first portion defines graphics for a depiction of a process plant element of the process plant via the user interface, while the second portion identifies a data source for data indicative of on-line operation of the process plant element to be displayed via the depiction. The graphical parameter is set forth in a declarative format.

In some embodiments, the first portion defines an instance of a shape object utilized in rendering the depiction. Alternatively or in addition, the first portion defines an instance of a composite shape object utilized in rendering the depiction. In either case, the declarative format may be in accordance with an extensible markup language. Furthermore, the declarative format may include a vector graphics format for expressing the graphics.

The first portion may further define a data conversion parameter to specify a graphical depiction of the data indicative of on-line operation of the process plant element. The object entity may also include a third portion defining a method to be implemented to simulate the on-line operation of the process plant element. The object entity may also include a third portion defining a method to be implemented to simulate the on-line operation of the process plant element. The third portion may be set forth in the declarative format. The second portion may also be set forth in the declarative format. The graphics may include animated elements having animation indicative of the on-line operation of the process plant element.

DESCRIPTION OF THE PREFERRED EMBODIMENTS

Figure 1:
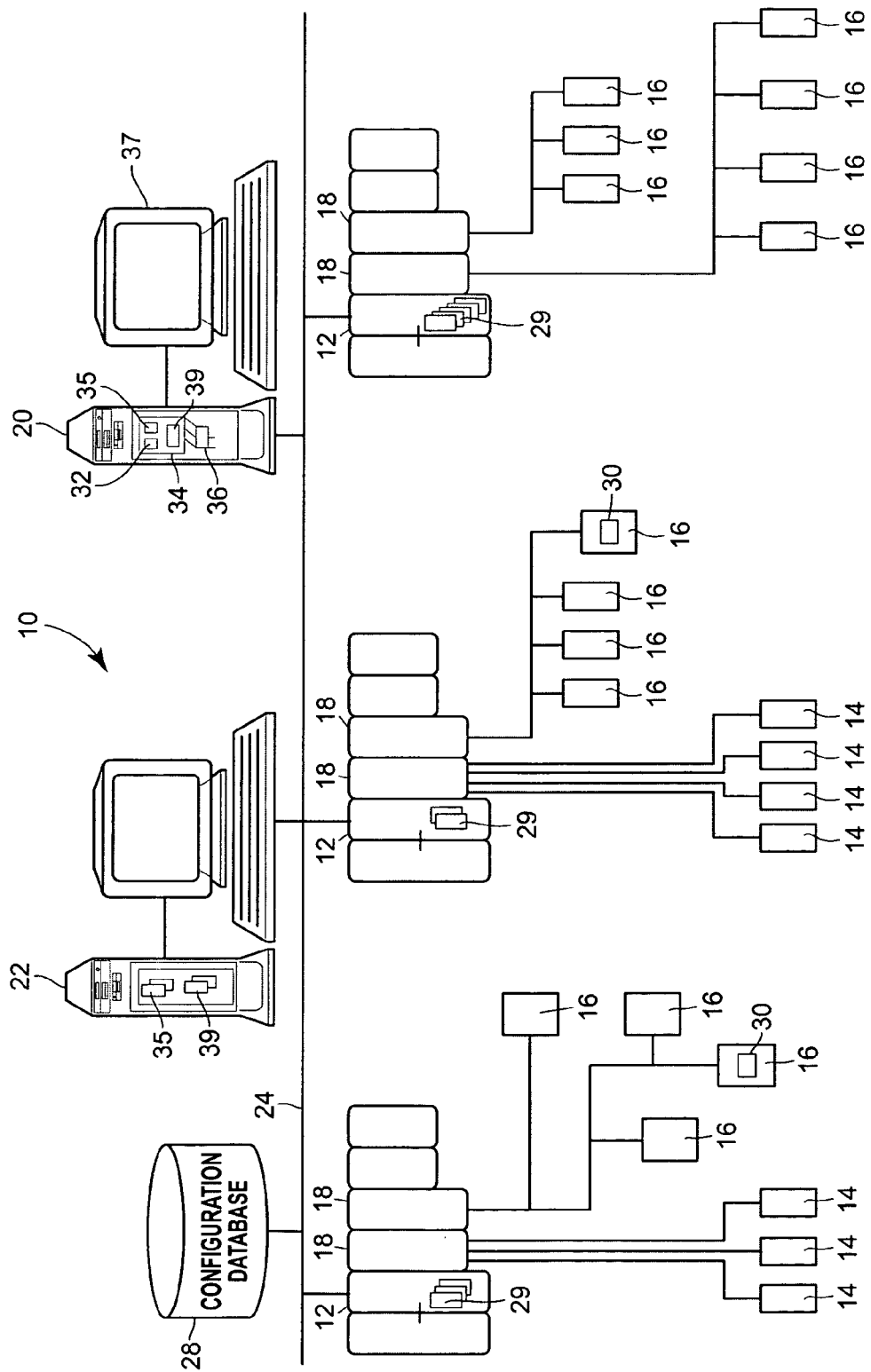
FIG. 1 is a block diagram of a distributed process control network located within a process plant including an operator workstation that implements a display routine which uses smart process objects to create process modules and graphic displays to simulate the operation of the process plant.

The process plant user interface system disclosed herein is generally configured and structured to present user information and content in support of the operation and maintenance of the process plant in a consistent and familiar form, and in an extensible and flexible manner. The content and information presented via the user interface is created, configured, stored and processed in a manner that enables broad, configurable and customizable access thereto. To these ends, and to address the above-described shortcomings and limitations of past process plant user interfaces, the user interface and its graphic structures (e.g., graphic display elements representative of process plant elements, as well as menu, panel, faceplate and other user interface structures), links to other documents or data sources, and any other embedded or composite shapes, are set forth, configured, and defined in a flexible and extensible format. The format may be defined by a declarative (or markup) language referred to herein as PGXML (Process Graphics Extensible Markup Language). As described further herein, PGXML may be based on the industry standard markup language XML. The comprehensive definition of the user interface via PGXML may also support the rendering of advanced graphics. To this end, the PGXML script to be described herein may be convertible into a vector graphics format, such as Microsoft XAML or Scalable Vector Graphics (SVG). Non-graphics related components of the PGXML script may then be used to create and establish data structures, commands or other instructions, and files to support the other functionality defined via the PGXML description of the user interface. Thus, the PGXML script generally sets forth internal definitions of the graphics structures of the graphic display elements to be depicted in a display, as well as other aspects of the elements, in order to support the generation of process graphics runtime files to be downloaded to the workstations and other display devices on which the display will be depicted.

A primary purpose of the user interface is to provide a virtual view into the process plant at a system level. To this end, described herein is a modular, object-oriented approach to defining a user interface that provides the virtual view of the process plant in both on-line and off-line contexts and that enables interaction and control at the system level. Generally speaking, the graphical objects may include properties that specify data sources for process values from the process plant, for process control values from the process control system, and for values and data from other systems or sources, as described below. Such properties, and the files and other data generated therefrom, accordingly establish data communication links for the process graphics rendered from the graphical objects.

The following disclosure of various embodiments of the process plant user interface solution begins with a contextual description of an exemplary process plant for which the user interface may be provided. Following that section is a description of the types of smart process objects that specify graphical, simulation and other functionality to support the depiction of both on-line and simulated operation of the process plant. An object model framework and declarative language for these smart process objects are then described.

Referring now to FIG. 1, an example process plant 10 in which smart process objects are used to form process graphic displays and process modules, both of which may be integrated with control modules to provide enhanced control and simulation within the plant environment, is illustrated in detail. In particular, the process plant 10 uses a distributed process control system having one or more controllers 12, each connected to one or more field devices 14 and 16 via input/output (I/O) devices or cards 18 which may be, for example, Fieldbus interfaces, Profibus interfaces, HART interfaces, standard 4-20 ma interfaces, etc. The controllers 12 are also coupled to one or more host or operator workstations 20 and 22 via a data highway 24 which may be, for example, an Ethernet link. A database 28 may be connected to the data highway 24 and operates as a data historian that collects and stores parameter, status and other data associated with the controllers and field devices within the plant 10 and/or as a configuration database that stores the current configuration of the process control system within the plant 10 as downloaded to and stored within the controllers 12 and field devices 14 and 16. While the controllers 12, I/O cards 18 and field devices 14 and 16 are typically located down within and distributed throughout the sometimes harsh plant environment, the operator workstations 20 and 22 and the database 28 are usually located in control rooms or other less harsh environments easily assessable by controller or maintenance personnel.

As is known, each of the controllers 12, which may be by way of example, the DeltaV™ controller sold by Emerson Process Management, stores and executes a controller application that implements a control strategy using any number of different, independently executed, control modules or blocks 29. Each of the control modules 29 can be made up of what are commonly referred to as function blocks wherein each function block is a part or a subroutine of an overall control routine and operates in conjunction with other function blocks (via communications called links) to implement process control loops within the process plant 10. As is well known, function blocks, which may be objects in an object oriented programming protocol, typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process plant 10. Of course hybrid and other types of complex function blocks exist such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function block, ladder logic, etc. and are not limited to being designed and implemented using the function block or any other particular programming technique.

In the plant 10 illustrated in FIG. 1, the field devices 14 and 16 connected to the controllers 12 may be standard 4-20 ma devices, may be smart field devices, such as HART, Profibus, or FOUNDATION™ Fieldbus field devices, which include a processor and a memory, or may be any other desired type of device. Some of these devices, such as Fieldbus field devices (labeled with reference number 16 in FIG. 1), may store and execute modules, or sub-modules, such as function blocks, associated with the control strategy implemented in the controllers 12. Function blocks 30, which are illustrated in FIG. 1 as being disposed in two different ones of the Fieldbus field devices 16, may be executed in conjunction with the execution of the control modules 29 within the controllers 12 to implement process control, as is well known. Of course, the field devices 14 and 16 may be any types of devices, such as sensors, valves, transmitters, positioners, etc. and the I/O devices 18 may be any types of I/O devices conforming to any desired communication or controller protocol such as HART, Fieldbus, Profibus, etc.

In the process plant 10 of FIG. 1, the workstation 20 includes a suite of operator interface applications and other data structures 32 which can be accessed by any authorized user (sometimes referred to herein as a configuration engineer and sometimes as an operator although other types of users may exist) to view and provide functionality with respect to devices, units, etc. connected within the process plant 10. The suite of operator interface applications 32 is stored in a memory 34 of the workstation 20 and each of the applications or entities within the suite of applications 32 is adapted to be executed on a processor 36 associated with the workstation 20. While the entire suite of applications 32 is illustrated as being stored in the workstation 20, some of these applications or other entities could be stored in and executed in other workstations or computer devices within or associated with the plant 10. Furthermore, the suite of applications can provide display outputs to a display screen 37 associated with the workstation 20 or any other desired display screen or display device, including hand-held devices, laptops, other workstations, printers, etc. Likewise, the applications within the suite of applications 32 may be broken up and executed on two or more computers or machines and may be configured to operate in conjunction with one another.

Generally speaking, the suite of applications 32 provides for or enables the creation and use of three different types of entities, the operation of which may be integrated together to provide for enhanced control, simulation, and display functions within the process plant 10. More particularly, the suite of applications 32 may be used to create and implement process graphic displays 35 (which generally provide an operator display pertaining to a portion of the process plant), process modules 39 (which generally provide a simulation of a portion of a process plant) and process control modules, such as the control modules 29, which generally provide or perform on-line control of the process. The process control modules 29 are generally well known in the art and may include any type of control module, such as function block control modules, etc. The process graphic display elements 35, which are described in more detail below, are generally elements that are used by an operator, engineer or other displays to provide information to a user, such as an operator, about the operation, configuration or set-up of the process plant and the elements therein. The process modules 39 are generally closely tied to the process graphic display elements 35 and may be used to perform simulations of the operation of the process plant or of some of the different elements therein connected in the manner depicted in the process graphic displays 35. The process graphic displays 35 and process modules 39 are illustrated as being stored in and executed by the workstations 20 and 22, although the process graphic displays 35 and the process modules 39 could be downloaded to and executed in any other computer associated with the process control plant 10, including laptops, handheld devices, etc.

Figure 2:
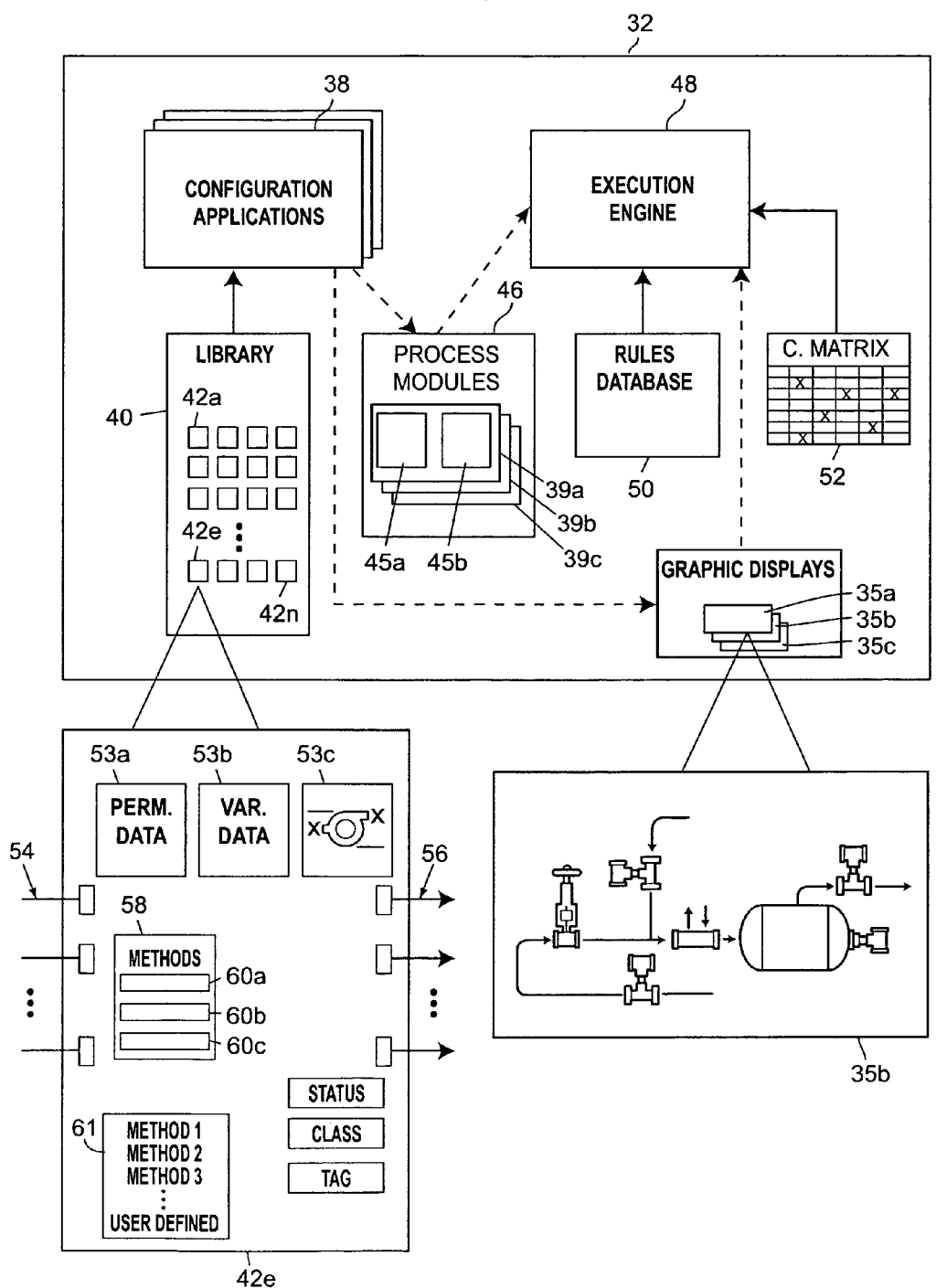
FIG. 2 is a logical block diagram of a set of applications and other entities, including smart process objects and process modules, stored in the operator workstation of FIG. 1, which may be used to implement enhanced functionality in a process plant.

FIG. 2 illustrates some of the applications and data structures or other entities within the suite of applications 32 of the workstation 20. In particular, the suite of applications 32 includes control module, process module, and graphic display configuration applications 38 which are used by a configuration engineer to create control modules, process modules (also called process flow modules) and the associated graphic displays. While the control module configuration application 38 may be any standard or known control module configuration application, the process module and graphic display configuration application(s) may create process modules and graphic displays using one or more smart process objects, the nature of which are described in more detail below. Still further, while the process module and process graphic configuration applications 38 are shown separately, one configuration application could create both of these types of elements.

A library 40 of smart process objects 42 includes example or template smart process objects 42 that may be accessed, copied and used by the configuration application 38 to create process modules 39 and graphic displays 35. As will be understood, the configuration application 38 may be used to create one or more process modules 39, each of which is made up of or created from one or more smart process objects 42 and may include one or more process flow or simulation algorithms 45, which are stored in a process module memory 46. Additionally, the configuration application 38 may be used to create one or more graphic displays 35, each of which is made up of or created from one or more smart process objects 42 and may include any number of display elements connected together. One of the graphic displays 35b is illustrated in FIG. 2 in expanded form and includes a depiction of a set of process elements, such as valves, tanks, sensors and flow transmitters, interconnected by connection elements which may be pipes, conduit, power cables, conveyors, etc.

An execution engine 48 operates or implements each of the graphic displays 35 and the process modules 39 during runtime to create one or more process displays for an operator as defined by the graphic displays 35 and to implement simulation functionality associated with the process modules 39. The execution engine 48 may use a rules database 50 defining the logic to be implemented on the process modules 39 as a whole and the smart process objects within those modules in particular. The execution engine 48 may also use a connection matrix 52 which defines the connections between the process elements within the plant 10 as well as within the process modules 39 to implement the functionality for the process modules 39.

FIG. 2 illustrates one of the smart process objects 42e in more detail. While the smart process object 42e is illustrated as being one of the template smart process objects, it will be understood that other smart process objects will generally include the same or similar elements, features, parameters, etc. as described with respect to the smart process object 42e and that the specifics or values of these elements, features and parameters may be changed or varied from smart process object to smart process object depending on the nature and use of that smart process object. Furthermore, while the smart process object 42e may be an object within an object oriented programming environment and thus include data stores, inputs and outputs and methods associated therewith, this smart process object may be created by and implemented within any other desired programming paradigm or protocol.

As will be understood, the smart process object 42e, before being instantiated, is an object that is associated with a particular type of entity, such as a physical or a logical entity, within the process plant 10 of FIG. 1. However, after being copied and instantiated, the smart process object 42e may be tied to a particular entity within the process plant. In any event, the smart process object 42e includes a data store 53 that is used to store data received from or pertaining to the logical entity with which the smart process object 42e is associated. The data store 53 generally includes a data store 53a that stores general or permanent information about the entity to which the smart process object 42e pertains, like manufacturer, revision, name, type, etc. A data store 53b may store variable or changing data, such as parameter data, status data, input and output data, cost or other data about the entity to which the smart process object 42e pertains including data associated with the entity as it has existed in the past or as it now exists within the process plant 10. Of course, the smart process object 42e may be configured or programmed to receive this data (e.g., cost data) on a periodic or non-periodic basis, from the entity itself via any desired communication link, from the historian 28 via the Ethernet bus 24 or in any other desired manner. A data store 53c may store a graphical representation of the entity to which the smart process object 42e pertains and which is used for actual display to the operator via an operator interface, such as the screen 37 associated with the workstation 20 of FIG. 1. Of course, the graphical representation may include place holders (marked by underlines within the data store 53c) for information about the entity, such as information defined by the parameter or other variable data about the entity as stored in the data store 53b. This parameter data may be displayed in the graphical place holders when the graphical representation is presented to the operator on a display device 37 as part of one of the graphic displays 35. The graphical representation (and the smart process object 42e) may also include predefined connection points (marked by an "X" in the data store 53c) that enable an operator or configuration engineer to attach upstream or downstream components to the process element, as depicted by the graphical representation. Of course, these connection points also enable the smart process object 42e to be aware of the elements connected to that smart object as configured within a process module and may specify a type of connection element that must be used, such as a pipe, a duct, etc., a stream associated with that element, etc.

The smart process object 42e may also include one or more inputs 54 and outputs 56 to enable communication with other smart process objects within or outside of a process module in which the smart process object 42 is used. The connections of the inputs 54 and outputs 56 to other smart process objects may be configured by a configuration engineer during configuration of a process module by simply connecting other smart process objects to these inputs and outputs or by specifying particular communications that are to take place between smart process objects. Some of these inputs and outputs may be defined as being connected to the smart process objects connected at the predefined connection points for the smart process object as discussed above. These inputs 54 and outputs 56 may also be determined or defined by a set of rules within the rule database 50 and the connection matrix 52 defining the connections between different devices or entities within the plant 10. The inputs 54 and the outputs 56, which include data stores or buffers associated therewith will, generally speaking, be used to provide communications of data from other smart process objects to the smart process object 42e or to provide communications of data stored within or generated by the smart process object 42e to other smart process objects. These inputs and outputs may also be used to provide communications between the smart process object 42e and other objects within the process control system, such as control modules within the controllers 12, field devices 14, 16, etc.

As illustrated in FIG. 2, the smart process object 42e also includes a method storage 58 that is used to store zero, one or more methods 60 (illustrated as methods 60a, 60b and 60c in FIG. 2) which may be algorithms to be implemented by the smart process object 42e during execution of a process module in which the smart process object 42e is used. Generally, the methods 60 stored in the method storage 58 will use the data stored within the data storage portions 53a and 53b and data obtained from other smart process objects or even data from other sources, such as the configuration database or historian 28, via the inputs 54 and the outputs 56 to determine information about the process plant 10 or an entity within the plant 10. For example, the methods 60 may determine poor or bad operating conditions associated with the entity defined by the smart process object 42e, errors associated with that or other entities within the process plant 10, etc. The methods 60 may be preconfigured or provided based on the type or class of smart process object and will generally be executed each time the smart process object 42e is executed within the execution engine 48 during runtime. Some example methods 60 that may be provided within a smart process object, such as the smart process object 42e, include detecting leaks, dead band, dead time, movement, variability, condition monitoring, computing costs, or other conditions associated with the entity.

The methods 60 may also be provided to help simulate the operation of the process entity associated with the smart process object on the material flowing through that process entity. Thus, the methods 60 may be provided to calculate mass balances, energy balances, flows, temperatures, compositions, vapor states, and other system-level or stream level parameters associated with the material in the plant 10, to simulate operation of the element so as to calculate expected outputs based on provided inputs, etc. Of course, these are but a few of the methods that can be stored in and run by a smart process object 42e, and there are many other methods that may be used, with such methods generally being determined by the type of entity being represented, the manner in which that entity is connected in and used in a process plant as well as other factors. It is important to note that, while the smart process object 42e may store and execute methods that detect system-level conditions, errors, etc., these methods may also be used to determine other information about devices, logical elements, such as process control modules and loops, and other non-system-level entities. If desired, the methods 60 may be programmed or provided in any desired programming language, such as C, C++, C#, etc. or may be referenced to or may define applicable rules within the rule database 50 that should be run for the smart process object 42e during execution.

If desired, each smart process object may include a library of applicable algorithms or methods which may be used to define the simulation behavior of the smart process object when connected within a process module. Such a library is illustrated in a pull down menu 61 for the smart process object 42e of FIG. 2 and a similar menu may be associated with each other smart process object. The configuration engineer may define the simulation behavior of a smart process object when this smart process object is placed in a process module 39 by selecting one of the library of simulation algorithms (called method 1, method 2, etc.) via, for example, the pull down menu 61. In this manner, the configuration engineer may define different simulation behaviors for a smart process object depending on the type or nature of the process for which the smart process object is being used to model.

If desired, the configuration engineer may instead provide a proprietary or other user supplied algorithm to define the simulation behavior of the process element defined by the smart process block. Such a user defined algorithm (illustrated as the "user defined" entry in the pull down menu 61) may be provided to and stored in a smart process object when that smart process object is placed within or used within a process module 39. This functionality enables the simulation behavior to be customized by the user to thereby provide for better or more accurate simulation. If desired, and as will be described in more detail later, the smart process objects 42 or each process module 39 may include an operator actuatable switch (such as an electronic switch or a flag) that disables the use of the simulation algorithms within the smart process objects and that, instead, causes the behavior of the process module to be determined by a high fidelity simulation package or program, such as one provided by HYSYS. In this case, the smart process object or the process module obtains simulated parameters from the high fidelity simulation, as opposed to using the simulation algorithms within the smart process objects themselves.

During execution of a graphic display 35 or a process module 39 by the execution engine 48, the engine 48 implements the communications defined by the inputs 54 and outputs 56 to each of the smart process objects in the graphic display 35 or process module 39 and may implement the methods 60 for each of those objects to perform the functionality provided by the methods 60. As noted above, the functionality of the methods 60 may be located in programming within the smart process object or defined by a set of rules within the rule database 50 that the engine 48 executes, based on the type, class, identification, tag name, etc. of a smart process object, to implement the functionality defined by those rules.

It will be noted that an instance of the smart process object 42e has a tag or unique name within the context of the process module with which the smart process object 42e is associated and this tag or unique name may be used to provide communications to and from the smart process object 42e and may be referenced by the execution engine 48 during runtime. Process module tags should be unique within the control system configuration. This tagging convention enables elements within the process modules 39 to be referenced by elements within others of the process graphic displays 35, process modules 39 and even the control modules 29. Still further, the parameters of the smart process object 42e can be simple parameters, such as simple values, structured parameters or smart parameters that know the expected units and attributes associated therewith. Smart parameters can be interpreted and used by the process rules engine or execution engine 48 to assure all signals are being sent in the same units or are converted properly. Smart rules can also be used to turn on and turn off groups of alarms for the smart process objects (or process modules) to create a smart alarm strategy and/or interface for the operator. Still further, smart process object classes can be associated with equipment and module classes within the process control strategy of the plant 10 to provide a known linkage between a smart process object and the process variables it will need to interpret or access.

Smart process objects, when used in process graphic displays or process modules, may also include mode of operation, status, and alarm behavior so that these smart objects may be put in different modes during runtime, such as the off, start-up, and normal modes, may provide a status associated with the object based on its current operating state, and may provide alarms based on detected conditions, such as a parameter out of range, limited, high variability, etc. Furthermore, the status may be reflected in the smart process object's connection and relied upon, or used, to animate the view of the graphic display element rendered for the object. Status may also be back calculated through smart process objects to affect a state of smart process objects that occurred earlier in the process or displays. As described further below, smart process objects may also have a class/subclass hierarchy which enables them to be categorized in class libraries, to be collected together in a composite structure, etc. Still further, smart process objects may utilize information from other elements, such as control modules and other objects to enable the smart process object to recognize when its associated entity is busy or, for example, acquired by a batch control process within the plant 10.

Smart process objects may be associated with any desired process entity, such as physical devices like pumps, tanks, valves, etc., or logical entities such as process areas, measurements or actuators, control strategies, etc. In some cases, smart process objects may be associated with connectors, such a piping, conduit, wiring, conveyors, or any other device or entity that moves material, electricity, gas, etc. from one point to another point within the process. Smart process objects that are associated with connectors, sometimes referred to herein as smart links or connector elements, are also tagged (even though the actual device or connector itself may not be tagged or able to communicate within the process plant 10), and are generally used to represent material flow between other elements in the process.

Smart links will typically include properties or parameters that define how different materials or phenomena (such as electricity) flow through the connection (e.g. steam, electricity, water, sewage, etc.) These parameters may indicate the type and nature of flow (such as the general speed, friction coefficients, type of flow like turbulent or non-turbulent, electromagnetic, etc.) through the connector and the possible direction or directions of flow through the connector. Smart links may include programming or methods that ensure that the units of the source and destination object to which the smart link connects, match and, if not, may perform a conversion. The methods of the smart link may also model the flow through the connector using a model or an algorithm to estimate the speed or nature of the flow through the actual connectors, length and size of the physical connections, transport delay, etc. The stored parameters for the smart process object (such as friction parameters) may be used in these methods. Thus, in essence, the smart links or connector elements enable smart process objects to be aware of the other upstream and downstream objects or entities. Of course, smart links may, for example, define the connections between other objects, the type of fluid, such as liquid, gas, electricity, etc. within the system, the upstream and downstream side of the entities, which other entities are upstream and downstream of the entity for this smart process object, the direction of material, fluid, electric flow, etc. in any desired or convenient manner. In one embodiment, the matrix 52 may be created prior to execution of process flow modules and may define for the smart links the interconnections between the different devices within the plant and, therefore, the interconnections between the different smart process objects. In fact, the execution engine 48 may use the matrix 52 to ascertain the upstream and downstream entities and thereby define the communications between the smart process objects and the methods associated with the smart process objects. Still further, one or more sets of rules may be provided to be used by the smart process objects to interact with each other and to obtain data from each other as needed for the methods within the smart process objects and to resolve the impact of smart objects associated with output connections.

If desired, the smart process object 42e may also include hot links, such as URLs, to key documentation which may be applicable to the type of object, or which may be specific to the instance (depending on the criticality and application) of the device to which the smart process object 42e pertains. The documentation may be vendor supplied as well as user-specific. Some examples of documentation include configuration, start-up and shut-down procedures, operational and maintenance documentation. If desired, an operator may click on the object as displayed in an operator display to bring up the instance specific (if any) and generic documentation for the object or associated device. Also, the operator may be able to add/delete/change documentation independently of the system software such as maintenance requests, records of operational problems, etc. Furthermore, these hot links may be user configurable or changeable to provide the ability to add knowledge links to objects in the an operator interface, to provide for quick navigation to appropriate information associated with the object and to provide the ability to add work instructions specific to the customer, to the specific object type or even to the specific instance of the object.

While the process modules and process graphics are described above as being created together by the interconnection of different smart process objects, they may be created separately. For example, a process graphic may be created using smart process objects and, when completed, a process module for that graphic may be generated based on graphic elements and their interconnections in the graphic display. Alternatively, the process module may be first created using smart process objects and, once created, a graphic display for that process module may be automatically generated by the configuration application 38 using the graphic display elements in the smart process objects used to create the process module. Still further, a process module and a graphic display may be created separately and the individual elements within these two entities may be tied together manually by referencing one another (e.g., using the tag properties of the elements within the graphic display and the process module). Through this mechanism, a smart process object may be referenced by multiple displays. In any event, once created, a process graphic display and an associated process module may be run independently or separately, although they will typically communicate parameters and information back and forth as desired or needed.

Generally speaking, a set of predefined graphic elements may be provided in the configuration application to enable a user to construct operator or graphic displays that reflect the process plant. These graphic elements are designed to dynamically show on-line measurements and actuators that interface with the control system. In addition, unmeasured parameters that reflect process operation may be calculated using on-line process simulation provided in the process modules and may be shown as an integral part of the associated graphic displays.

Additionally, in an offline environment used for engineering or training simulation purposes, the process simulation provided by the process modules may be used in place of the process measurement values in the graphic elements and in the associated control modules. These values, which are calculated by the associated process modules, may be based on the actuator position or state as well as manual disturbance values illustrated in the process graphics. In this manner, the process graphic displays and control modules may be used in both on-line or control situation and in off-line or simulation situations. Also, while the static portion of the graphic elements will, in many cases, appear similar to the three dimensional components included in known graphics libraries, further unique features or properties of these graphic elements, the information displayed with these elements, and their links to the control system I/O and process simulation modules is described below with respect to a number of possible types and examples of graphic elements.

Generally speaking the graphic elements and simulation algorithms in the process module associated with a smart process object fall into a one of a number of different types of process elements including stream elements, process connection elements, actuator elements, processing elements, measurement elements and estimated property elements. Stream elements generally define a stream of material in the process plant and may be exposed in the graphic display to show the composition, density, flow, temperature, pressure, weight, and/or any other parameters defining the stream of material. Stream elements may be defined at the input of the process module and provided to elements within the process module to thereby enable the flow of material through the process module to be modeled and depicted in the graphic display. Similarly, stream elements may be illustrated at the output or end of the process module to illustrate in the graphic display the material output of the portion of the process plant depicted by the graphic display. Stream elements also may be used to define how different graphic displays (and the associated process modules) are connected with one another. For example, the output stream in one process module may be the input stream in another process module and may supply the values used at the input stream of the other process module. Streams may contain the following four parts: name (e.g., pH stream), direction (e.g., flow input), measurement (e.g., flow, pressure, temperature), and composition (e.g., nitrogen, ammonia, etc.) However, streams could have other parts or parameters if so desired.

Process connection elements define the manner in which materials within the plant, such as solid materials, liquid and vapor, and gases are delivered or carried from one device to another. To clearly illustrate the material flow through the process, three different types of process connections including piping, ducts and conveyors may be used. Of course other connection elements, such as electrical cables to address power flow in electrochemical processes, etc. may be used as well. Piping is generally used to illustrate (and simulate) liquid and high pressure vapor or gas flow within the plant. Ducts are generally used to illustrate (and simulate) low pressure gas flow within the plant. Conveyors are generally used to illustrate (and simulate) the movement of solid material between processing units. As a result, each process connection element defines the type of connection, such as a pipe connection, a duct connection or a conveyor connection that is used to provide material at the input or output of a device.

If desired, the properties of the material that is being transferred by a connection are determined by the upstream input. This information plus a connection status variable defining if the connection is complete may be made available as properties of the connection element on the graphic display. A connection element may start at a processing element output, an actuator element output or a stream element output. In a similar manner, a connection element may terminate at a processing element input, an actuator element input or a stream input.

The properties of a connection element may be automatically displayed when the cursor is placed over the connection element in the graphic display. Also, the properties associated with a connection element may be exposed for permanent display by placing a measurement or estimated property element (defined below) on the connection element. If desired, a connection element may be created by holding the left mouse button down over an element output (such as a stream output, a processing element output or an actuator element output) and, while holding down a button on the mouse, positioning the cursor over an element input. For the connection to be established successfully, the input and the output types (pipe, duct, or conveyor) of the upstream and the downstream elements must match. The connection will automatically take on the type of the upstream element.

If desired, piping elements can be shown or depicted in the process graphic display as a pipe connection, duct elements (e.g., air or gas) can be shown as a duct, and conveyor elements may be shown as conveyor belts. Piping, duct and conveyor element connections can be automatically routed between processing elements and arrows may be displayed outside the depiction of these elements to show the direction of the flow. If an upstream output is common to two connections, then a "T" element may be included in the pipe, duct or conveyor. Similarly, "T" elements may be used to combine multiple outputs. The color or other graphic property of a conveyor element may change to indicate its status, e.g., running/stopped, flowing/not flowing, plugged, etc. Generally speaking, the material flow along a conveyor is determined by the motor drive connected to the conveyor. Thus, a motor drive actuator (which is an actuator element described in more detail below) may be connected to the conveyor. Additionally, measurement elements (described below) can be connected to pipe, duct and conveyor elements to make it possible to expose measurements associated with the pipe, duct or conveyor elements, such as the speed of the conveyor or the flow of material in a pipe or duct, the properties of the material on or in the conveyor, pipe or duct, e.g. moisture or weight. Also, an exposed property element may be added to display properties of the material on or in the pipe, duct or conveyor that are not measured, for example, the composition of the material.

If desired, each of the piping, duct and conveyor connection elements may graphically and dynamically reflect a lost connection (e.g., by a color change), and that a selected property (pressure, temperature, length, etc.) is outside configured limits (e.g., by a color change). Furthermore, parameters calculated by the associated process module may be exposed in the graphic. For example, properties provided by the upstream connection, whether the connection status is bad or good, limits on one or more selected parameters of the connection element, etc. may be exposed in the graphic display to provide information to the operator about the connection element or the stream being transferred by the connection element.

Generally speaking, actuator elements are elements that perform some actuation function with respect to the stream and may be placed between different connection elements or between a processing element and a connection element. Examples of actuator elements include a regulating valve (with actuator), an on-off valve (with actuator), a pump (with motor), a force draft fan (with motor), an induced draft fan (with motor), an eductor (with on-off valve), a damper (with drive), a feeder (with variable speed motor), a conveyor motor drive (which may be attached to a conveyor element), etc.

The graphic depiction of the valve elements may dynamically reflect the implied valve position (by animation, for example), valve failure (by a color change, for example), the valve full open/closed position (by a color change, for example), and the AO, DO, DC, setpoint, PV, OUT, mode, etc. (by a numeric string or other indication, for example) of the associated control block controlling that valve. The simulation element associated with the valve elements (used in the process module) may have simulation algorithms that calculate parameters associated with the valve actuator, such as the discharge pressure, mass flow, liquid temperature, liquid composition, inlet pressure, and outlet pressure. These simulated or calculated parameters may be exposed in the process graphic, if so desired. However, the user or configuration engineer must usually configure the reference to an AO, DO or DC block in a control module associated with the valve as well as the valve type (e.g., linear, quick opening, equal percentage, valve sizing, etc.) and the stroke time from open to close. Of course, the simulation algorithms available to simulate the operation of the valve on the material flowing through the valve may be dependent upon the type of the valve and sizing information.

The graphic depiction of pump elements may dynamically reflect the motor status (using, for example, a color change), the associated DO or DC function block mode and setpoint (using, for example, strings), the motor speed (if variable speed drive is used), the AO setpoint, PV, OUT mode (if variable speed drive is used) and other desired parameters. Likewise, the process simulation (used in the process module) for this element may determine or calculate parameters such as the discharge pressure, liquid composition, liquid temperature, and mass flow, which parameters may be exposed in the graphic display. The user may need to define a pump curve based on the pump type. However, the user may configure the reference to the DO or DC block associated with the motor start/stop, the reference to the associated AO function block for variable speed drive (if used), and the pump curve (e.g., pressure versus flow) for the defining the operation of the pump.

The graphic depiction of a force draft or an induced fan actuator element may have a depiction that dynamically reflects the motor status, DO or DC function block mode and setpoint, motor speed (if variable speed drive is used), the AO setpoint, PV, OUT, DO or DC function block mode (if variable speed drive is used) and other desired parameters, any of which may be exposed in the graphic display. The process simulation element (used in a process module) for this element may determine or calculate parameters such as the discharge pressure, gas composition, gas temperature, and gas mass flow, which parameters may be exposed in the graphic display. The user may configure the reference to the associated DC block for motor start/stop, the reference to an AO block for variable speed drive (if used), and the fan curve (pressure versus flow) for defining the simulated operation of the fan.

In some cases a particular type of actuator may only be used with a specific type of connection, e.g., a pipe, a duct or a conveyor. The table below defines some example connection limitations for typical actuator elements.

|  | Pipe | Duct | Conveyor |
| --- | --- | --- | --- |
| Regulating valve | X | | |
| On-Off Valve | X | | |
| Pump | X | | |
| Eductor | X | | |
| Force Draft Fan | | X | |
| Induced Draft Fan | | X | |
| Damper Drive | | X | |
| Feeder | X | | X |
| Motor Drive | | | X |

Processing elements include plant equipment that processes the materials or streams in the plant in some manner. Generally speaking, all inputs and outputs to and from processing elements will be made through connection elements. Standard processing elements include tanks (vertical and horizontal), heaters, static mixers, reactors, mixers, air heaters and any other elements that perform some type of simple or standard processing activity. For standard processing elements, the user may specify the number of inputs and outputs to the element along with the physical equipment properties e.g. size, volume, etc. The simulation algorithm and static representation of these standard processing elements may be set so that they cannot be modified by the user but may be selectable as described above at configuration time. Of course, if desired, other, typically more complex plant equipment (such as distillation columns, evaporators, separators, boilers, etc.) may be implemented as custom processing elements. The static representation, number of inputs and outputs and the simulation algorithm of such custom processing elements may be modified to meet the user interface requirements. Once a custom processing element has been defined, it may be saved as a composite or template that may be reused or used as a starting point in the creation of other processing elements.

The tank standard processing element (either vertical or horizontal) may be configured based on the pipe connections to the tank and the tank element may dynamically reflect the level in the tank (using, e.g., dynamic animation), and the level at 100% or empty (using a color change, for example). The process module simulation for the tank may calculate and expose, via the graphic display, parameters such as the outlet temperature, the outlet composition, the liquid temperature and the simulated level of the tank. However, to tie the tank into the system, the user or configuration engineer may need to configure the number of input and output connections, the complete connections to the tank, the tank properties, such as size (e.g., diameter and height), etc.

The heater processing element may dynamically calculate and reflect, via the graphic display, the heat transfer coefficient (e.g., using a color change), the outlet product temperature, the inlet product temperature, the outlet pressure (assuming fixed drop), etc. A user or configuration engineer may need to configure the complete connections to the heater, the heater surface area and the heat transfer coefficient when clean.

Of course, other processing elements such as a static mixer, a reactor, a mixer, an air heater, a heat exchanger, etc. may have display and simulation capabilities that are tailored to these types of devices. Non-standard processing elements, such as distillation columns, evaporators, separators, boilers, etc. may be represented graphically using a custom processing element in which the simulation associated with the vessel may be user defined if not included in a standard selection. The processing in these elements may be described or defined as a step response model relating each input to each output of the vessel. Inputs may be gas and/or liquid streams. Optionally, the user may define the equations that describe the relationships between the inputs and outputs of the processing element and these equations may be stored in the process module using that element to perform simulation. If desired, some simple static graph representations may be provided to help the user quickly create the static graphics associated with a custom processing element. If these simple graphics are used, then the user may need to only specify the desired number of input and output connections and the type of connection supported (e.g., pipe, duct, or conveyor) supported by the custom processing element. In response, the graphic item will be displayed and can be immediately used in the creation of the operator graphic. If desired, the gains and any dynamics associated with each input and output of the process element may be specified if the user elects to specify the simulation algorithm as step responses. If the user selects a custom algorithm, then an expression editor may be provided for the user to define the simulation algorithm. Based on the method selected, the properties of the custom processing element outputs may be calculated differently. Furthermore, the user may reference one or more of the algorithms that they have defined in a separate software assembly.

Additionally, several pre-defined composites or templates may be provided for creating custom processing elements. These templates may include, for example, a boiler template having a custom algorithm that calculates the exit gas $O_2$, the exit gas CO, the steam generated, the boiler drum level and the boiler draft. Such a template may be based on a single fuel input. However, by modifying the template, it is possible to simulate boilers with multiple fuels. Other pre-defined templates may include a specialized vessel-cyclone separator template, which may be used with in conjunction with a spray dryer custom processing element, and which may include a step response model to model the operation of the separator. Likewise, a column template, a spray dryer, and an evaporator body may utilize a step response model to define the expected process response. In an evaporator, based on the energy input and the concentration of the input flow, the concentration of the outlet flow and vapor release can be calculated. Multiple evaporator elements may be connected together along with heat exchanger and eductor elements to create a multiple-effect evaporator. Similarly, a specialized vessel-stack custom template processing element may be used with the boiler processing element. In this case, the properties of the inlet may be carried through the stack with no modifications if so desired, or to reflect emissions reductions performed in the stack.

Other types of elements that can be used to create process graphic displays and process modules include measurement elements and property elements. Measurement elements include transmitter elements, which may be used in the graphic display to access the measurement value associated with a physical transmitter, and switch elements. Generally, the transmitter element may dynamically reflect bad or uncertain status, the mode of the associated AI function block in the control module, the measurement value and units, etc. associated with an actual transmitter (sensor) or other data associated with the actual transmitter. In an off-line mode (or simulation mode) the transmitter element may be used to access and display the simulation value provided by the process module rather than the value associated with the AI or PCI block or may be used to provide a measurement value to the associated AI block in the control module as a measurement to be used in the simulated control routine. The transmitter element can be added to a connection element or to a processing element and, when such a transmitter element is added to the display, the user will generally need to identify the associated AI, PCI or DI block in controller scheme that is providing the measurement. In the on-line mode, the value of the measurement may be shown next to this measurement element. In the off-line mode (or simulation mode) the simulated value of the measurement (as developed by the corresponding process module) may be automatically displayed. In on-line operation, the user can elect to switch control and display to the simulated value in the event of a measurement failure.

A switch element may dynamically reflect a bad or uncertain status, the mode of the associated DI (e.g., manual or OS), and the discrete value of a switch (on, off, etc.) When in an off-line simulation mode, the user may use the switch display element to access and change the switch parameters in the graphic display and control module by selecting a simulation value or a manual value and status and by manually entering the value and status of the switch. However, a user may generally configure the switch element by providing a reference to an associated DI block in the control scheme, a reference to the element property that triggers the switch, and the limit and deadband associated with a change of state of the switch.

An estimated property element generally exposes an estimated property of the system as determined by the process module and may be added to a connection or processing element to display any property of that element. When this element is placed on a connection element or on a piece of equipment, the user can browse and select the properties that will be displayed. Thus, simulated properties that are not available through a physical measurement may be exposed through the use of the estimated properties element. Such an estimated property element may dynamically reflect a good/bad connection, the estimated property value(s), and a property that is outside of an associated limit or change. A user must generally configure the reference to property(s) to be displayed and the limits and color changes for the element if the property is outside of the limits.

As will be understood, by attaching transmitter elements and estimated property elements to processing elements, actuator elements and connection elements, the properties associated with the inputs and outputs of these process plant elements may be referenced during on-line operation or off-line simulation. These properties may also be made visible in the process graphic display.

Figure 3:
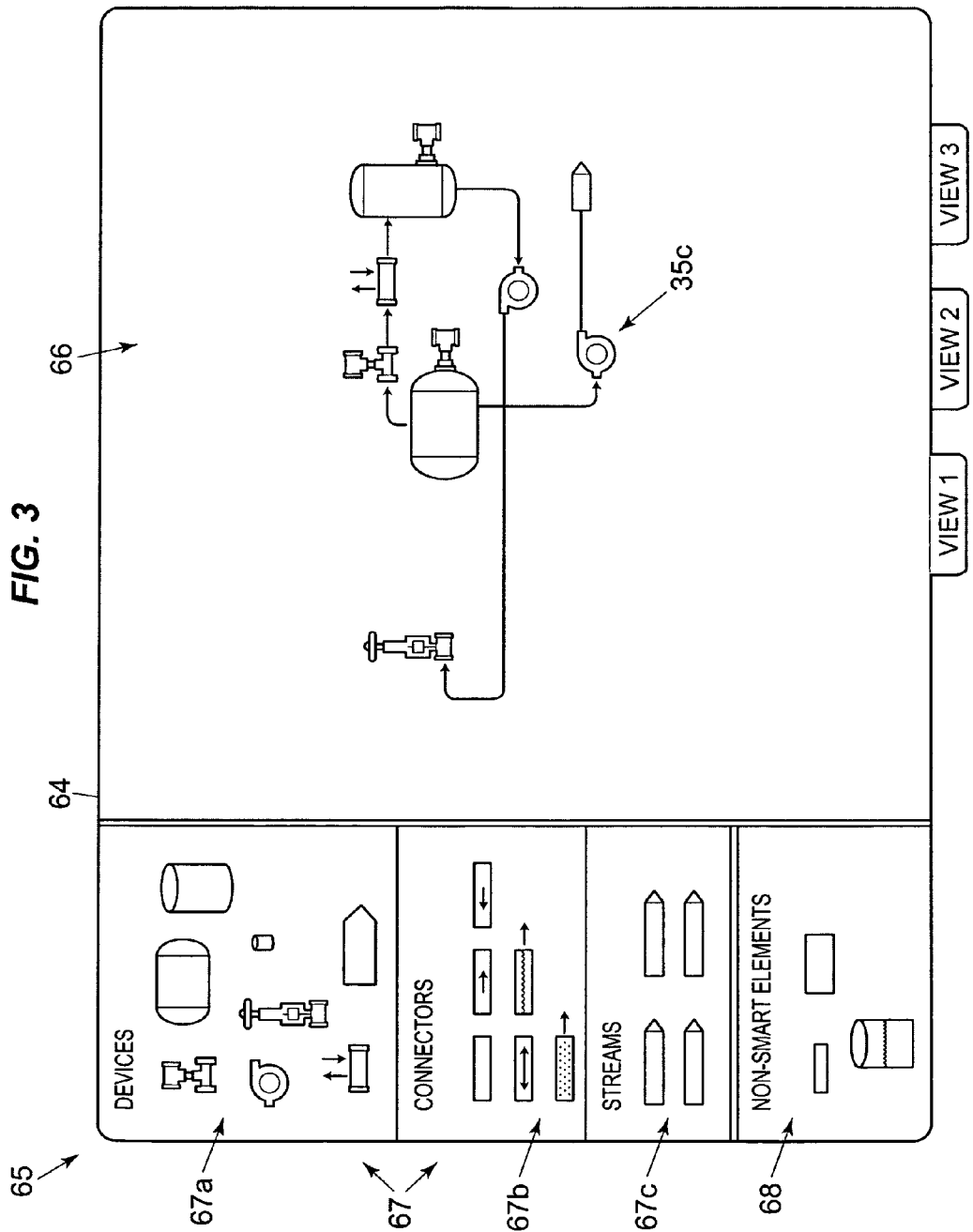
FIG. 3 is a simplified depiction of a configuration screen used by a configuration engineer to create a process graphic display or a process module using smart process objects stored in an object library.

Generally speaking, an operator may run or execute the configuration application 38 to create one or more process modules 39 or graphic displays for implementation during operation of the process 10 or for implementation in a simulation environment. In one embodiment, the configuration application 38 presents a configuration display, such as that illustrated in FIG. 3, to the configuration engineer. As seen in FIG. 3, a configuration display 64 includes a library or template section 65 and a configuration section 66. The template section 65 includes a depiction of sets of template smart process objects 67, which may include the smart process objects 42 of FIG. 2 and may be any of the connection, measurement, stream, processing, and estimated property elements described above. If desired, non-smart elements 68 that only have a graphic definition may also be provided. Essentially, the templates 67 and 68 are generic objects that may be dragged and dropped onto the configuration section 66 to create an instance of a smart process object within a process module or graphic display (or both). A partially completed process graphic display 35*c* is illustrated as including a valve, two tanks, two pumps, a flow transmitter and two sensors interconnected by flow path connectors, which may be smart links or connector elements as described above and providing a stream output. It will be noted that the graphic display 35*c* may be made up of both smart process objects and non-smart elements.

When creating a graphic display, such as the graphic display 35*c* (or a process module), the configuration engineer may select and drag the smart process objects 67 and the elements 68 illustrated in the template section 65 onto the configuration section 66 and drop them there in any desired location. Generally, the configuration engineer will select and drag one or more smart device process objects 67*a* or non-smart elements 68 depicting devices onto the configuration section 66. The configuration engineer will then interconnect the smart device process objects within the configuration section 66 with smart connector process objects 67*b* and may place input and output streams 67*c* into the display. Moreover, non-smart elements may be added to the display. The configuration engineer may change the properties of each of the smart process objects during this process using pop-up properties menus, etc. and, in particular, may change the methods, parameters, tags, names, hot links, modes, classes, inputs and outputs, etc. associated with these smart process objects. When the process or configuration engineer has created a process module with each of the desired elements, typically representing a process configuration, area, etc., the configuration engineer may define rules or other functionality associated with the module. Such rules may be execution rules such as those associated with the performance of system-level methods, like mass balance and flow calculations. The process engineer or operator may also decide to add trends and faceplates that would be useful when the process display is on-line. After creating the graphic display 35*c*, the configuration engineer may save that display in a memory and may, at that time, or later, instantiate and download that display to the execution engine 48 in a manner that the execution engine 48 may provide a graphic display. Of course, the configuration engineer could create a process module in the same or similar manner although different graphics may be depicted for process module elements as opposed to process graphic display elements. Furthermore, the operator may elect to turn on levels of detail while they are running the plant. For example, one of the levels of detail would show the composition at each connection.

As noted above, the process graphic or process module may be provided with a specific tag. For example, smart process object elements within a graphics display or a process module may be provided a tag including an alias that can be filled in or selected at runtime by, for example, the execution engine 48 based on other factors, such as a piece of equipment or a route selected within the process control system. The use of alias names and indirect referencing in process control systems is discussed in detail in U.S. Pat. No. 6,385,496, which is assigned to the assignee of the present invention and which is hereby expressly incorporated by reference herein. Any of these techniques may be used to provide and resolve aliases in tags for the smart process objects described herein. With the use of aliases and the like, the same process module may include or be used to support different views for sets of equipment, etc.

The configuration application 38 may be used to design the display 64 of FIG. 3 in a multi-layered manner such that, for example, tabs (View 1, View 2 and View 3) may be used to access and create different views of the process module or graphic display. These tabs may be used in this configuration environment to access and create the different views, and may, or may not, be made available for switching between such views during runtime (i.e., when the execution engine 48 generates the process graphic display for a user). In either case, the different views may be selectively provided to support different users associated with the process plant.

Generally, when the configuration engineer creates a process module or a graphic display, the configuration application 38 automatically stores the smart process objects, along with the connections therebetween, in a database. This database may then be used to create other process modules and graphic displays using one or more of the same smart process objects. As such, when creating the further displays, the configuration engineer can simply reference the smart process object, as already created and stored within the database, and any methods, etc. stored therewith to place that smart process object in the further display. In this manner, the database may be populated as the process control modules and graphic displays are created and the database may be used at any time to create and execute other displays and modules using smart process objects which already exist within the process flow database. Using such a database, each smart process object within the database may support or be used in process modules and referenced in multiple graphic displays. As will also be understood, the process modules may be constructed by building displays for these modules and then specifying flow algorithms to be used in or associated with process modules. Of course, individual process modules may be spread across and executed by different computers and process modules may be communicatively connected to one other to operate in conjunction with each other, either on the same or on different computers. When this is done, input and output streams will be externally referenced to tie process modules together.

As noted above, the configuration engineer may, as part of the process module or graphic display creation, attach or provide the simulation algorithm of the process module. These simulation algorithms may be preconfigured to calculate or determine certain process or system-level properties, such as mass balance calculations, flow calculations, efficiency calculations, economic calculations, etc. with respect to the process depicted or modeled by the process module. As a result, the process modules themselves may have mode, status, and alarm behavior, can be assigned to workstations, and may be downloaded as part of the display downloads. If desired, the simulation algorithms may be executed by the execution engine 48 to perform mass or heat balancing, flow routing, flow efficiency, flow optimization, economic calculations related to process simulation or other desired calculations using the data provided in the smart process objects of the process module. Still further, these simulation algorithms may access parameters from the control strategy, i.e., the control modules associated with and downloaded to the controllers, field devices, etc. and may, conversely, provide data or information to these control modules.

It will be understood that the execution engine 48 is needed to enable the process algorithms to execute across an amalgamation of all process objects and links configured on all displays. Thus, the simulation algorithms (within the process modules) will generally execute regardless of whether any associated graphic display is loaded, i.e., called up and currently displaying information to a user. Of course, the simulation algorithms may be cross-checked across the entire process 10 or across defined subsets of the process 10. It will also be understood that, during execution of any particular process module, the execution engine 48 may provide a display to an operator on an operator interface depicting the interconnected objects or entities within the process module based on the graphic display associated with that process module. The parameters, graphics, etc. of the display will be determined by the configuration and interconnection of the smart elements within the process module. Furthermore, alarms and other information to be provided on this or other displays may be defined and generated by the methods within the smart process objects and the simulation algorithms associated with a particular process module. If desired, the execution engine 48 may provide a display for a process module to more than one operator interface or may be configured or set to provide no display, even though the execution engine 48 continues to execute the process flow module and thereby perform the methods, alarm behavior, flow algorithms, etc. associated therewith.

Figure 4:
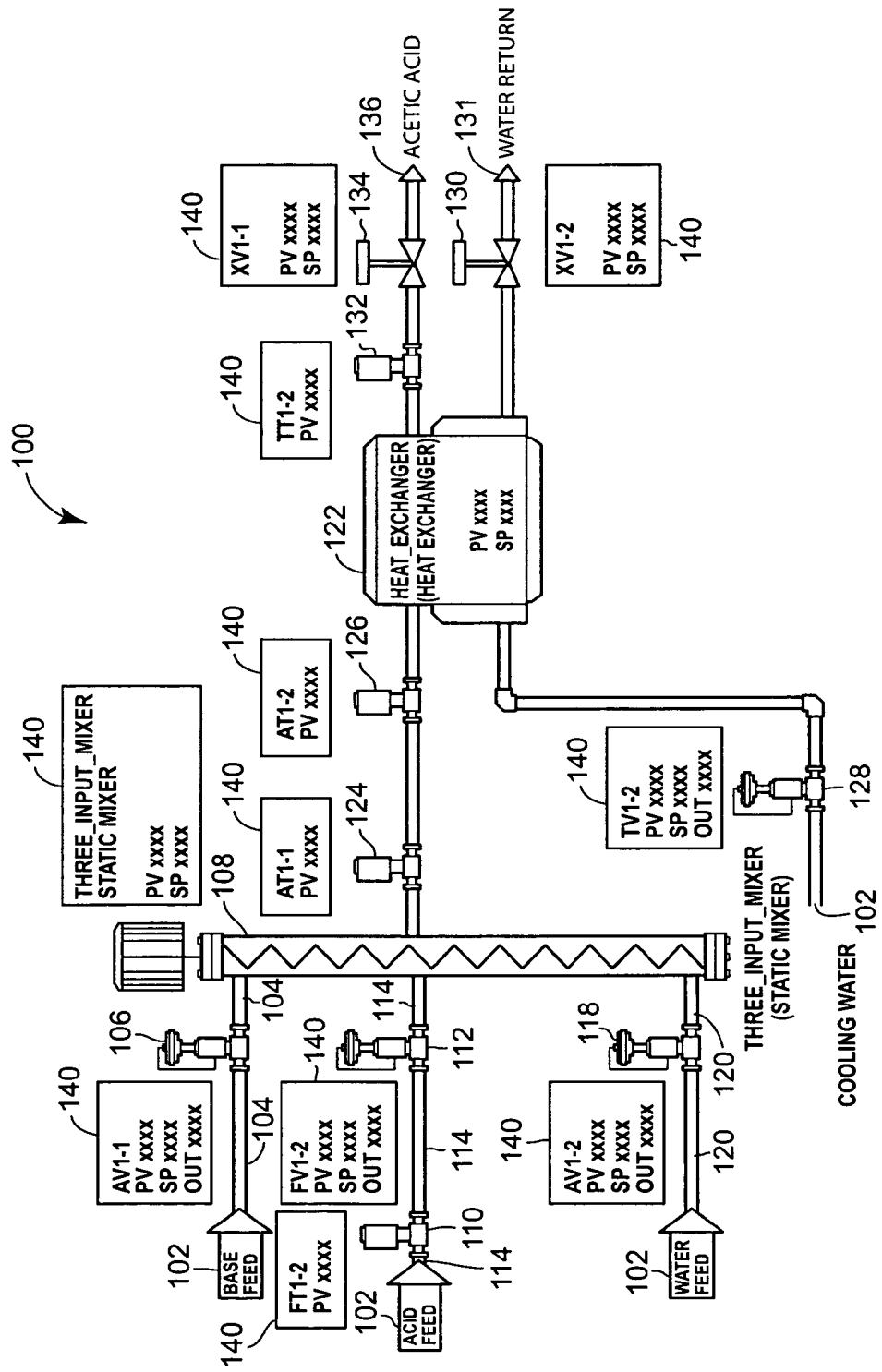
FIG. 4 is a detailed depiction of an exemplary process graphic display including a depiction of streams and connection elements within the process plant, the depiction being created by interconnecting the graphic display elements of a number of smart process objects.

FIG. 4 illustrates an exemplary process graphic display 100 that may be created using the elements and configuration applications described above. In particular, the graphic display 100 depicts a portion of process plant that produces white vinegar from water, acid and a base. As illustrated in FIG. 4, the process graphic display 100 includes four stream elements 102 at inputs thereto defining the streams of Base Feed, Acid Feed, Water Feed and cooling water. The Base Feed stream 102 is delivered through a piping connection element 104 to an actuator element in the form of a valve 106. The output of the valve 106 is connected to a first input of a mixer 108 via a piping connection element 104. In a similar manner, the Acid Feed 102 is connected to a transmitter element 110 and then to a further valve 112 which is connected to the mixer 108. The Acid Feed 102 and transmitter 110, the transmitter 110 and the valve 112 and the valve 112 and the mixer 108 are connected via piping connection elements 114.

As can be easily seen, an output of the mixer 108 is connected to a heat exchanger 122 via piping and two transmitters 124 and 126. The cooling water stream 102 is delivered to the heat exchanger 122 via a valve 128 and exits the heat exchanger via a valve 130 to produce a return water stream element 131. Likewise, the output of the heat exchanger 122 is delivered through a transmitter element 132 and a valve 134 to provide an output Acetic Acid stream element 136. While not always called out in particular, the elements in the graphic display are in all cases connected with one another via piping connection elements.

It will be understood that display boxes 140, which may be generated as properties of the display elements themselves or which may be separate elements in the form of transmitter and estimated property elements or elements that reference blocks in control modules, are illustrated in the graphic display 100 to indicate or expose parameters, such as process variable (PV) values, setpoint (SP) values, OUT values, etc. associated with the different elements. Additionally, if the user were to place a cursor over some of the elements, the display 100 may illustrate other values associated with the referenced elements. For example, placing the cursor over one of the stream elements (such as the Acetic Acid stream output 136), may cause the graphic to indicate the composition, pressure, temperature, density, flow rate, etc. of the acid stream at this point in the process. Of course, the values and parameters displayed on the graphic display 100 may be delivered from an actual referenced transmitter within the process control system (such as from an AI block in the control system), or from a process module simulation element that simulates the functionality of the element. The graphic display 100 of FIG. 4 may be provided to a user during operation of the process which makes white vinegar or to implement a simulation of that process to be used, for example, to perform design or operator training activities.

It will be understood that the functionality of the smart process objects, the graphic display elements and the process modules described herein may operate in the operator workstation 20 and does not need to be downloaded to and configured within the controllers, field devices, etc. within the plant 10, which makes this functionality easier to implement, view, change, etc. Further, this functionality enables system level determinations to be made more easily than within the process devices, controllers, etc. because the information pertaining to the devices on a system level is all typically available to the operator workstation 20 in general and to the execution engine 48 in particular whereas all of this information is not typically made available to each controller and field device within the process plant 10. However, when it is advantageous to do so, some of the logic associated with the process modules, such as primitives, may be embedded in the devices, equipment and controllers down within the process plant. The use of smart process objects to create integrated process control modules and graphic displays enables the execution engine 48 to, for example, automatically detect leaks and produce smart alarms with minimal amounts of user configuration activities, to calculate and track flow and mass balances within the plant 10, to track losses within the plant 10 and to provide higher level diagnostics for the plant 10 and to simulate the operation of the plant during engineering design and operator training.

Figure 5:
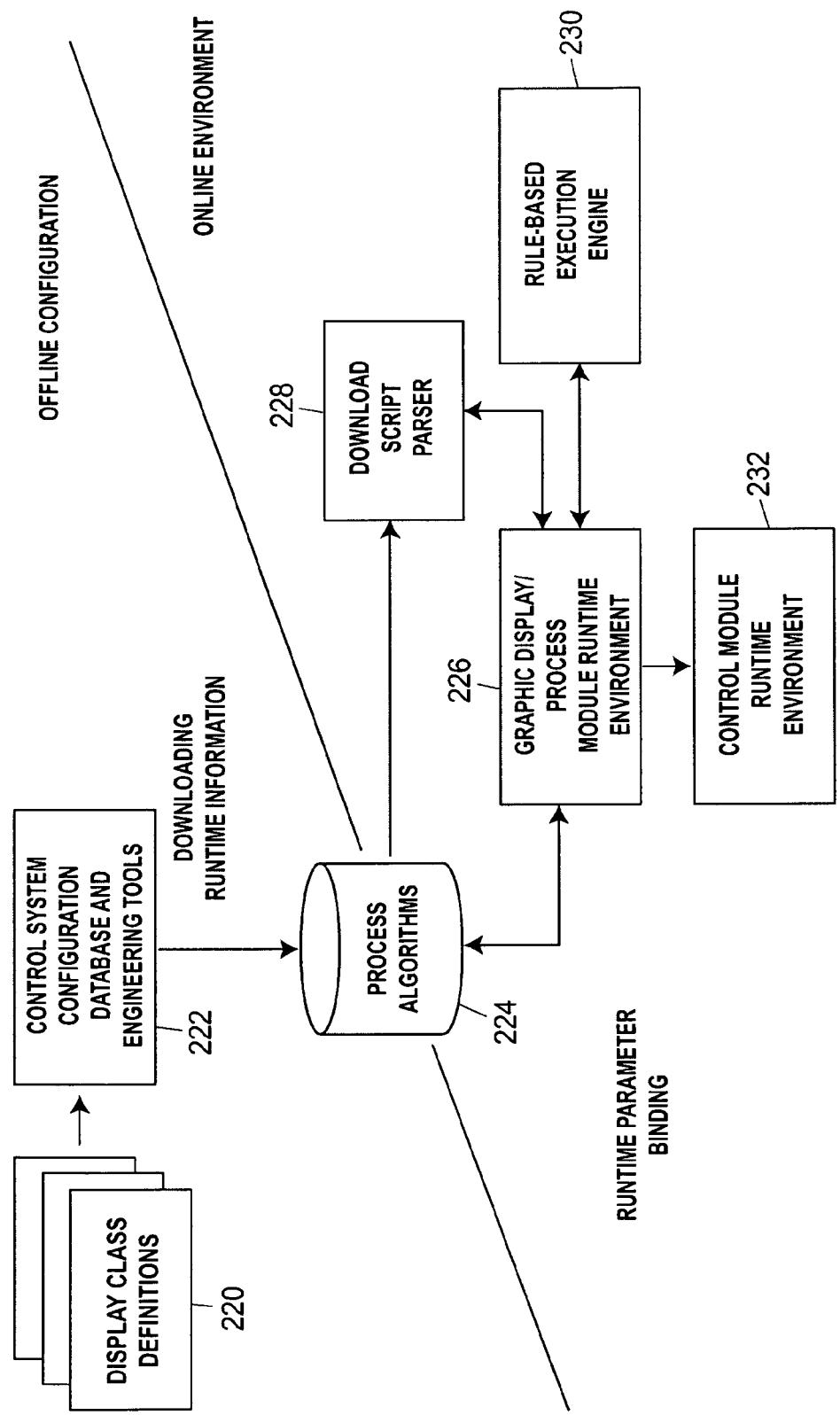
FIG. 5 is a logical block diagram of a manner in which process modules using smart process objects may be created in and implemented within an existing process control network.

FIG. 5 depicts one possible manner of integrating the execution engine 48 and the process modules and graphic displays used thereby within a process plant having a distributed control strategy. As illustrated in FIG. 5, the display class definitions 220 created by or associated with the process modules providing displays to an operator during execution by the execution engine 48 and are provided to the control configuration database and engineering tools 222 which may use and organize these display class definitions in any desired manner within the control strategy documentation. Process algorithms 224 may be connected to these display class definitions prior to runtime and then the display class definitions and flow algorithms bound thereto may be instantiated and provided to the graphic display/process module runtime environment 226 (which may be implemented in the form of one or more execution engines 48 in one or more workstations). The graphic display/process module runtime environment 226 uses a download script parser 228 to parse the code during execution (i.e., to perform just in time object code conversion) and uses a ruled-based execution engine 230 to execute flow algorithms or other rule based procedures provided for or bound to the display classes. During this process, the graphic display/process module runtime environment 226 may communicate with the control module runtime environment 232, which may be executed in controllers and field devices associated with the process, to provide data or information to the control module runtime environment 232 or to access data or other information from the control module runtime environment 232. Of course, the graphic display/process module runtime environment 226 may communicate with the control module runtime environment 232 using any desired or preconfigured communication networks, such as the Ethernet bus 24 of FIG. 1. Still further, other methods of integrating the graphic displays, process modules and control modules described herein into a standard process control system or process plant may be used as well.

As described above and shown in the exemplary process graphic display of FIG. 4, smart process objects have both graphical and simulation elements, and are used to depict both on-line and simulated operation of process plant elements found in a plant. An object class model framework and declarative format to support the creation of the graphical and simulation elements of the smart process objects are set forth in greater detail in connection with one or more embodiments. Generally speaking, each smart process object represents a physical device or process plant element. To this end, each smart process object defines a graphic display element that may be used in a process graphic display depicting that element. Each smart process object may also define or establish a simulation model of the process plant element, which may include one or more algorithms, methods, or other actions directed to providing an off-line simulation of the process plant element. In certain embodiments, a smart process object may include a rendering definition of a graphic display element to be displayed to the operator, data storage for storing parameters pertaining to the location (e.g., path) and processing of data indicative of the on-line operation of the process plant element, and methods, algorithms, or other steps that may be implemented as a result of events occurring while the graphic display element is displayed via the user interface. The methods, algorithms, and other processing called for by the smart process objects may be implemented by the execution engine. The content and information generated from this implementation may be presented via the process graphic displays, which may also be generated by the execution engine, or by one or more rendering engines (e.g., a vector graphics rendering engine) provided to depict the process graphic display on one or more display devices, respectively.

Before describing in greater detail the manner in which the objects and declarative format support the definition and processing of the process graphic displays and graphic display elements thereof, it should be noted that further information regarding smart process objects and process graphic displays and their use with process modules, may be found in (i) U.S. patent application Ser. No. 10/278,469, entitled "Smart Process Modules and Objects in Process Plants," which was filed on Oct. 22, 2002, (ii) U.S. patent application Ser. No. 10/625,481, entitled "Integration of Graphic Display Elements, Process Modules and Control Modules in Process Plants," which was filed on Jul. 21, 2003, and (iii) U.S. patent application Ser. No. 11/014,307, entitled "Process Plant Simulation Using Smart Connection Elements," which was filed Dec. 16, 2004, the entire disclosures of which are hereby expressly incorporated by reference in their entirety herein. For instance, in U.S. patent application Ser. No. 11/014,307, reference is made to FIGS. 5-8 thereof and the corresponding textual subject matter set forth in paragraphs [0075] to [0107], where FIG. 5 thereof shows nested process graphic displays, FIG. 6 thereof shows an association of a process module associated with a process graphic display, FIGS. 7A and 7B thereof show the communication interconnections between, and the integration of, a process graphic display, a process module and a control module, and FIG. 8 thereof shows an interconnected process and control modules providing advanced control and simulation capabilities. Further information regarding the configuration of process graphic displays using a display editor that may, for instance, be provided as part of the configuration application 38, may be found in the commonly assigned international application concurrently filed herewith, identified herein above, and also claiming priority to the U.S. provisional application referenced above and entitled "Graphics Integration into a Process Configuration and Control Environment," the entire disclosure of which is hereby incorporated by reference.

Further details related to the manner in which smart process objects are configured and defined in the configuration environment of the disclosed process plant user interface solution, as well as assembled, compiled or otherwise processed for use in the runtime environment thereof, are now described in connection with certain embodiments that utilize a declarative, or markup, language to support the configuration, generation and operation of the above-described smart process objects and their associated process graphics. Generally speaking, the format established by the markup language, and the script set forth therein, may be utilized to define and support a process plant user interface (and user interface system) having modular, dynamic process graphics that are data-bound or linked to the process plant equipment, process control elements, and other systems or devices to which they pertain. As a further result, the resulting user interface is extensible and flexible, thereby enabling users to create or modify the user interfaces as process plant conditions, equipment, control routines, etc. warrant.

As described below, the script set forth in the markup language is directed to generating the dynamic graphics of the displays and display elements described herein. In addition to supporting the respective structures of the process graphics, the information set forth in the markup language format also defines the functionality (i.e., operation or behavior) of the elements depicted in the display, including actions related to data conversions, event handling, and other actions supported by the smart process objects associated with the elements. More generally, the information set forth in the markup language may include script or code that establishes any functional or operational aspect of a process graphic display, and any graphic display element thereof, as well as any aspect or functionality of the user interface itself.

The markup language defines these graphics and other aspects of the user interface in accordance with an object model, the architecture, or framework, of which is also described below. The manner in which the information set forth in accordance with the object model and markup language is processed (e.g., converted) in preparation of, for instance, the runtime environment, is also described, including any processing steps taken by, for example, the download script parser 228 or other entity serving as a script conversion or processing engine.

The use of a declarative or markup language generally supports the generation of the process plant user interfaces shown and described herein for use during both configuration and runtime environments and, more generally, to operate and maintain the process plant. Basing the presentation of information across these various contexts on a markup language enables the information to be presented and stored in a form that is accessible to users in a consistent and familiar manner regardless of, for instance, where the user wants to use the information. As a further result, the user interface, including its menu structures, links to other documents, links to external information, embedded and replaceable shapes, etc., are described in a flexible and extensible format. The markup language internal to the configuration and runtime environments establishing this format, PGXML, is described below in connection with a number of embodiments. While based on the industry standard extensible markup language (XML), PGXML may alternatively be based on any other markup or declarative language. Furthermore, and as discussed in greater detail below, the process graphics information set forth using PGXML may be subsequently converted in connection with instantiation, compilation, downloading, rendering, or other processing steps. Such processing may include a conversion of certain information described in PGXML into other declarative formats, such as Microsoft's internal format for user interfaces, XAML (Extensible Application Markup Language), or the open source format, SVG (scalable vector graphics). The PGXML information converted into such vector graphics formats (e.g., XAML or SVG) may generally be used in a framework and with extensions to support the entirety of the dynamic and other graphics defined via the internal PGXML format. An exemplary process graphics framework and, more generally, process graphics architecture for generating such process graphics utilizing PGXML and XAML script are described below.

The XML-based process graphics architecture and framework may utilize one or more object models, including, for instance, an internal object model represented and defined by PGXML, and the object model represented and defined by XAML, to specify the drawing shapes and other graphics utilized by, and presented in, the user interface. The XAML format specifies the drawing shapes utilizing vector graphics commands. Furthermore, as is well known to those users of Microsoft's WinFX Avalon implementation, XAML script can support dynamic data representations (i.e., animation) in addition to static data. Using this capability, the dynamic shapes and attributes of the process graphics elements may therefore be associated with real-time values, historical values, physical properties such as mass-flow and composition, and other process or simulation data of a variable nature. In this sense, the XML-based graphics described herein are data-driven.

By way of background, XAML is the schematic representation of Microsoft's WinFX Avalon implementation, which forms an element of Microsoft's Longhorn operating system release along with the Indigo client-server architecture. The object model and other details regarding XAML and Avalon are well known to those skilled in the art, and further information regarding each may be found at the Microsoft Internet website for developers of Avalon-based software, msdn.microsoft.com/longhorn. Briefly stated, XAML supports vector graphic shapes consisting of straight lines and curves, images, and text. It supports the basic graphical shapes including rectangles, circles, ellipses, and polygons. Additional basic, primitive or other shapes relevant to process plants and manufacturing may be added, as described below. User interfaces utilizing the XAML format may also implement animation techniques as complicated as generating three-dimensional morphing effects. Such animation and other complex effects may be incorporated into the process graphics as described below.

The vector graphics nature of the XAML format allows such complex graphical information to be stored in a sequence of text-based commands that draw various vector graphic shapes. This information can be converted by various methods to display an application-specific graphics image. Another general capability provided via the XAML format is scalability. Use of the XAML format in process graphics allows graphic display elements to be re-sized or scaled without jagged edges because redrawing instructions are sent to a rendering program capable of implementing XAML-based commands, rather than being sent as pixel values in a bitmap. The execution engine 48 of the runtime environment may provide one or more rendering engines for each target environment, at least one of which may be dedicated to processing the XAML-based commands for the generation of the process graphic displays described herein.

Because the images are vector-based, the same high-quality images are produced regardless of where a display is rendered, i.e., whether on smart phones, handhelds, high-end monitors, or other display devices. Therefore, the process graphics and, more generally, the process plant user interface may be generated in a consistent manner regardless of the nature of the display device. The user interface is accordingly not limited to implementations involving a workstation, although such workstations still may be involved in a server, database, or other capacity. Furthermore, because of the use of a markup language, the user interface solution may be provided and, thus, the process graphic displays may be generated, via an Internet, or web, communication connection established via browser or other software compatible with the language. In such cases, the XML-based and/or XAML scripts may be downloaded to remote devices simply having a rendering engine (as opposed to having an entire copy of the user interface application installed thereon). In other words, the run-time environment provided by the process graphic displays becomes an Internet or web application having all of the integrated simulation and other functionality described above in connection with process modules, etc.

Using the XML-based object model and framework described below together with the XAML script generated therefrom, every element in a process graphic display may be animated. The Avalon framework, in turn, supports bitmap-style filter effects for creating high-impact graphics. These filter effects also generally provide configuration engineers and other users the ability to add a variety of effects directly to graphic display elements and text in the configuration environment. For example, the process graphics may include and support effects such as blending, tiling, shape rotation or transformation, morphing, offset, merging, and special lighting. It should be understood that these and other XAML- or Avalon-based effects may be made available in connection with the exemplary process graphic displays and elements thereof shown in the figures hereof. Such filter effects may also be applied separately or in any combination with a vector image, such that special effects such as mouse-over features may be assigned to any XAML graphical object.

In embodiments where the PGXML descriptions are converted to XAML, the vector graphics and other above-described features, advantages and capabilities provided by XAML may be utilized at runtime in process graphic displays and graphic display elements thereof having animation and other dynamic graphics features.

The text-based nature of markup languages such as XML and XAML also makes it convenient for the configuration, runtime and other user interface applications 32 to store and communicate process graphics and other data via download scripts. Because process graphic elements may be stored as text, the user interfaces applications 32 may generally include search functionality to support searches for text within images.

The XML-based object model disclosed herein, and the framework or architecture established thereby, has a number of advantages in addition to advanced graphics. For example, the use of XML-based descriptions produces small file sizes that allow for fast downloading. Additionally, the extensible nature of the object model enables the generation of a significant library of pre-built graphic display elements that can be supplemented. To this end, the framework may include an object model having groups, composites, classes and templates, further details of which are described below. As also described below, the configuration engineer or other user may generate graphic display elements (e.g., shapes, composites, classes, and templates) from external information regarding device, equipment, or other entities. For example, the information for the graphic display element for such entities, as well as entire process graphic displays, may be imported from third-party providers such as INtools.

The XML-based architecture disclosed herein also supports utilizing and displaying data at runtime that is derived from a number of different sources in a distributed computing environment. For example, and as referred to above, the data displayed via the process graphics may originate in an associated process control system (e.g., the DeltaV Historian), an OPC-based system, any XML file, or any other source or system. To these ends, the process graphics architecture includes an abstraction or data source layer to establish the relationship of the data to the XAML-based graphic. For instance, if the XAML script for a process graphics elements describes an image that represents data in terms of pixels (e.g., filling a bar), the real-time data may be provided by instrumentation located in the process plant in units of degrees Fahrenheit. As described further below, the data source is identified and a logical relationship between the graphical element and the data is established and provided along with the code necessary for conversion, scaling, etc. prior to the rendering of the process graphic element. In this way, the resulting process graphics user interface provides the data in a format easily understood and not subject to misinterpretation.

The XML-based functionality is provided and realized within the suite of interface applications and data structures 32 described herein above. Specifically, the process graphics may be created in a configuration environment that includes the graphic display configuration application 38, which, in turn, may have a number of operational modes for creating graphics display elements, e.g., shapes, composites, classes, templates, and dynamos, each of which is described in greater detail herein below. The configuration application 38 may generally present a graphics editor having a number of integrated tools (e.g., GUI and other tools) used for a number of tasks, including, for instance, creating scripts and binding graphics to data sources. The steps taken during the use of such tools is described further herein below. After configuration and conversion to the XAML format, the runtime environment involves the implementation of the XAML-based commands by the aforementioned execution engine 48. More specifically, the runtime environment may include an interface application to provide back-end support for executing and rendering the process graphic displays and elements thereof inside the framework as defined by a runtime workspace.

Turning now to FIGS. 6-11, where like elements are identified with like reference numerals, the configuration of process graphic displays and the creation of graphic display elements are now described in connection with an exemplary interface or environment 300, which may be generated by the configuration application 38 or via any other device capable of rendering the XML-based process graphics. The process graphic display being created, and each of the graphic display elements thereof, are described internally via the PGMXL format during this configuration process. Further details regarding the manner in which the PGXML format supports and defines these displays and elements is provided below.

Figure 8:
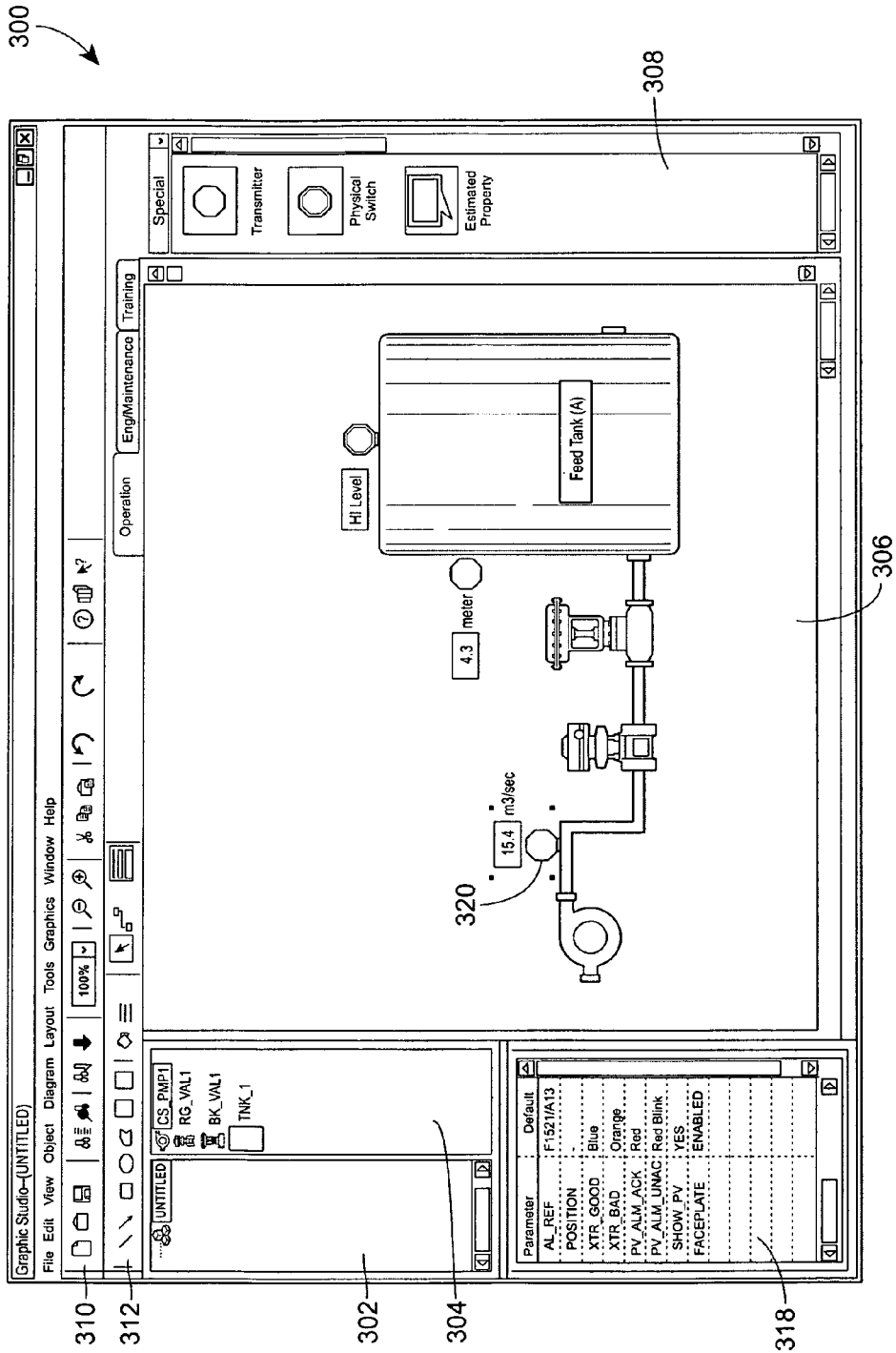
Figure 9:
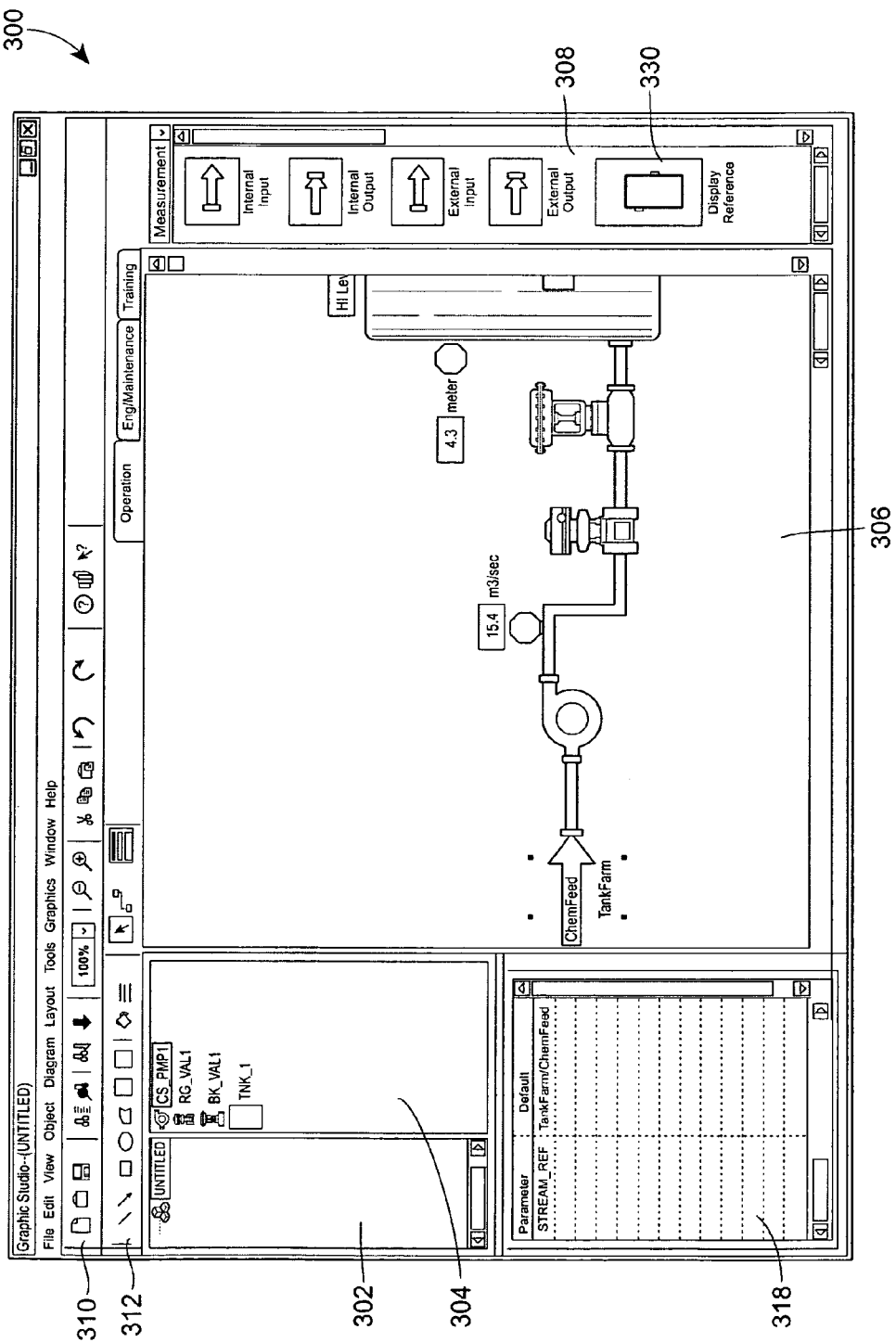

The interface 300 generally provides the graphics editor for a configuration engineer or other user to create and define the process graphics for the runtime environments for plant operations, engineering, maintenance, management, and other roles defined for the plant. FIGS. 6-11 progressively depict a process graphic display being created using the interface 300, which may have a number of sections or panels dedicated to defining attributes, parameters or other aspects of the process graphic display and the graphic display elements thereof. For instance, the interface 300 may include one or more organizational panels 302, 304 to provide contextual or overview information for the graphic displays. The panel 302 may present the name of the process graphic display and its relative location within the plant (e.g., its relationship to other process graphic displays). The panel 302 may also list and arrange the various process graphic displays already created by plant area or by any other desired criterion. The panel 304 may identify the names of each graphic display element that have been added to a work area, or canvas section 306 of the interface 300. As described above, a generic version of each element may have been selected and dragged from a palette section 308 into the canvas section 306. The palette section 306 may include a number of sub-sections for different types of elements to represent the different equipment, instrumentation, or other process plant elements to be represented by the process graphic display being created. For instance, the palette section 306 may include an actuator sub-section (FIG. 6), a processing equipment sub-section (FIG. 7), a measurement device sub-section (FIG. 8), and a special (or custom) sub-section (FIG. 9). The editor interface 300 also includes one or more toolbars 310, 312 that present the various editing tools for graphics selection, creation, editing and other processing.

After graphic display elements are dragged from a palette into the canvas section 306, the user may connect the elements together by, for instance, holding down the left mouse button over a connection point and moving the cursor to a destination connector. The resulting connection may then be automatically drawn by the editor 300 between the two elements in an auto-routing fashion. Alternatively, an elbow or bend in a connection may be automatically provided each time the mouse button is released before the cursor reaches a defined connection point. Further, the type of connection (e.g., pipe, conveyor or duct) may automatically be defined by the definition of the nature of the connection points. In the example shown in FIGS. 6-9, a pipe 314 is created at a downstream connection point of a pump 316. When a connection supports multiple types of connections, then the default connection type may be defined by, for instance, selecting a toolbar icon 317.

Figure 6:
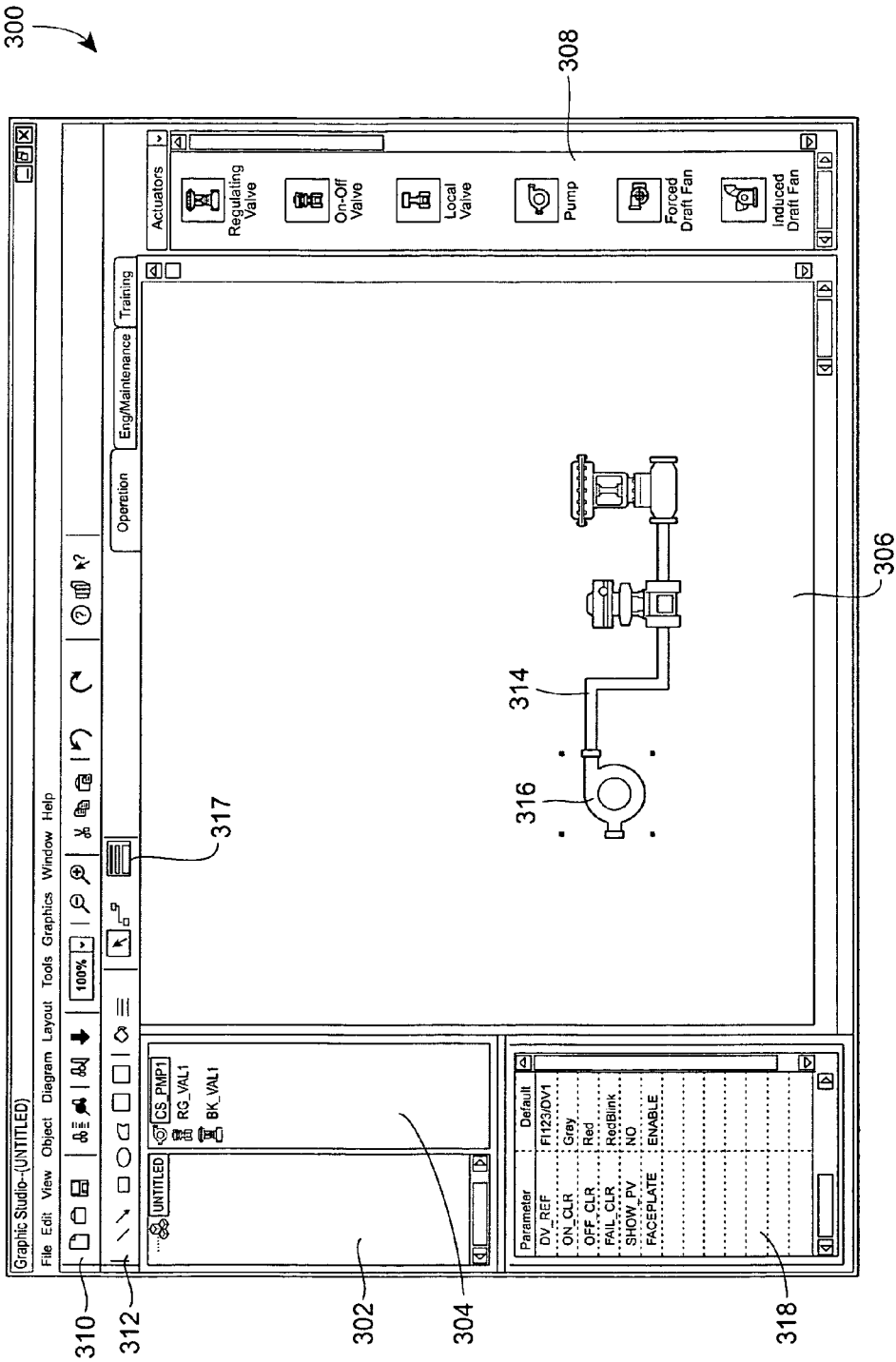
FIGS. 6-11 are depictions of portions of multiple exemplary process graphic displays configured and constructed using a markup language-based object model.

Individual graphic display elements placed in the canvas section 306 may be selected by clicking the mouse button (or other cursor pointing device) on or near its graphic representation. When the element is selected, then a list of configurable parameters associated with the display graphic element may be displayed in a parameter panel 318. As shown in FIG. 6, the selection of the pump 316 reveals that graphical aspects of the element, such as the color to depict the pump being on ("ON_CLR") and off ("OFF_CLR"), are specified. FIG. 8 shows a transmitter 320 represented by a graphic display element having information specifying one or more function block references as a data source, e.g., F1521/A13 for the AI_REF parameter. Selection of one of these reference parameters, a dialog may be provided that allows the user to define the path to the desired data source, e.g., control module/block/parameter. Further information regarding the specification of parameters, reference parameters, attributes and other aspects of graphic display elements is set forth below.

Figure 7:
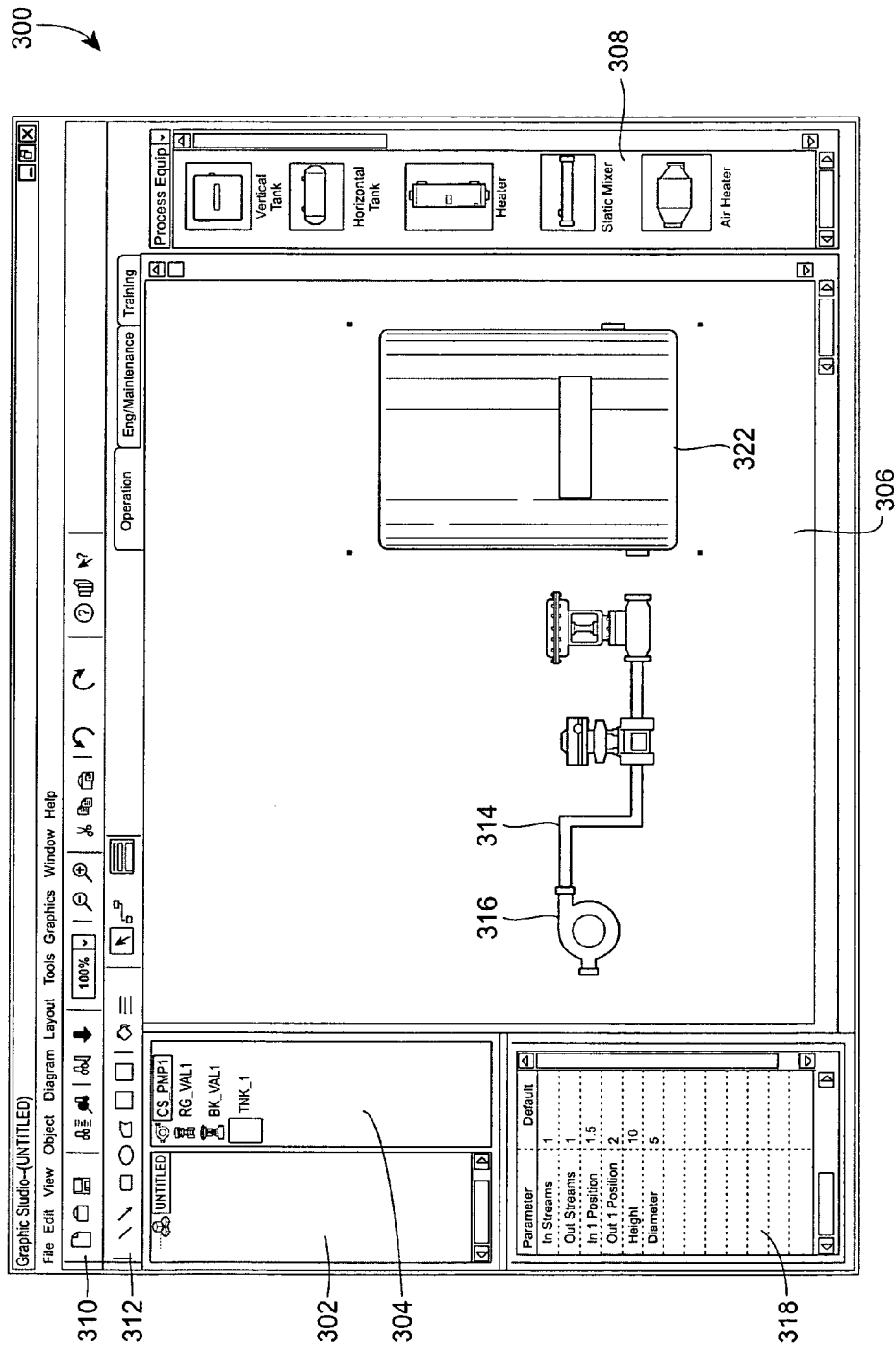

With specific reference to FIG. 7, common processing elements such as tanks, mixers, heat exchanges may be added to the display using the processing equipment palette. When a processing element, such as a tank 322 is added to the display, it may then be stretched to a size that is appropriate for the display. Selecting an element like the tank 322 also provides an opportunity to specify the number of input and output streams, or connection points, for the element via the panel 318 (see, e.g., In Streams, Out Streams). The position of connection points may also be modified through the corresponding parameters shown in the panel 318 (see, e.g., In1 Position, Out1 Position).

The custom equipment palette shown in FIG. 9 may be supplied for less common processing equipment, stream elements, and references to other process graphic displays (i.e., display references). For example, the starting and ending points of a stream may be identified. Internal stream references allow the source of the stream to be named via the panel 318 as shown. External stream references may include parameters used to identify the associated stream defined in another display.

Figure 10:
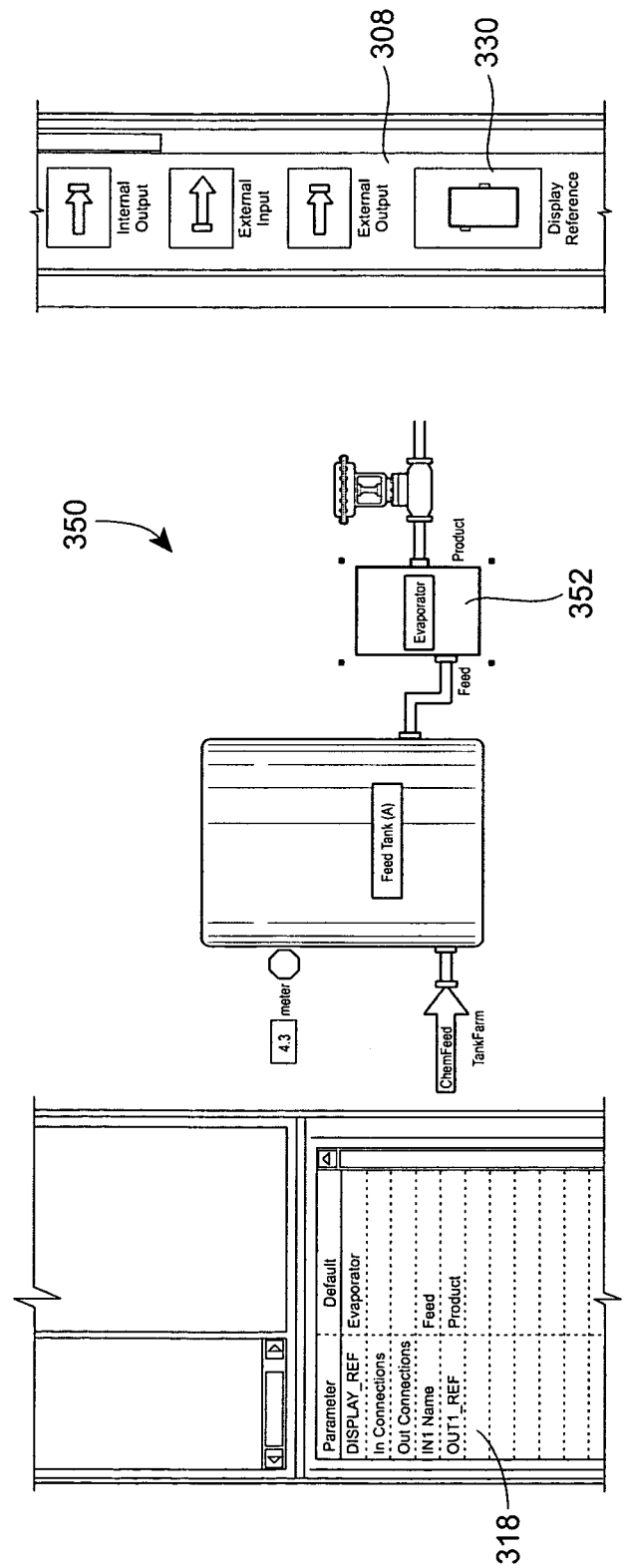

FIG. 9 also shows another example of a special graphic display element, namely a generic, or template, display reference 330, which is provided in the palette section 308 to support an identification of another process graphic display for presentation of the referenced display within the current display and with, by implication, all of its associated functionality and underlying graphic display elements. FIG. 10 shows a portion of a simplified process graphic display indicated generally at 350 after the display reference template 330 has been selected and dragged into the canvas section for placement and connection within the process graphic display 350. In this case, the configuration engineer has modified the display reference template 330 to identify an evaporator display 352. To this end, a "DISPLAY_REF" parameter in the panel 318 may be modified or specified to identify the process graphic display by name and, in some cases, path.

Figure 11:
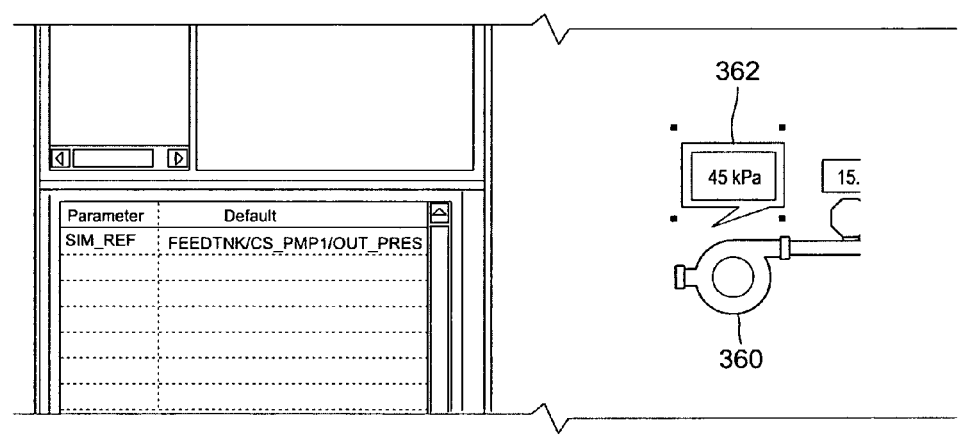

FIG. 11 provides an example of a customized content layer of a process graphic display and, specifically, a pump 360 thereof having an estimated property element 362 that is shown when a user has, for instance, engineering access privileges. As described in greater detail in the International Patent Application entitled "Customized Process Graphic Display Layers For A Process Plant User Interface System Having Integrated Simulation" filed concurrently herewith, which is hereby expressly incorporated by reference in its entirety, a user may select or be provided with one or more content layers of the process graphic display commensurate with the characteristics of the user's profile, which may specify the user's access privileges. In the example of FIG. 11, the user is provided with access to simulation information calculating the pump discharge pressure of the pump 360 via the estimated property element 362.

The above-described graphic display elements (and smart process objects more generally) may be pre-defined or created by a configuration engineer or other user at any time. The manner in which the configuration application 38 enables the creation or definition of these graphic display elements utilizes an object model framework and respective PGXML descriptions. Each element may have a set of intrinsic properties that correspond to process variables, constants, or other external values. The element may define several visual representations that may include dynamic behavior, for example color changes or animation. Changes in values received from the process control system may prompt the dynamic behavior of the elements in the display to alter their visualization.

As described in the above-identified, concurrently filed application, two tools may be provided for configuring these process graphics. The first tool may be an element editor used to configure process graphic elements, thereby adding custom elements to a number of pre-configured process graphic elements that may be included in the process plant user interface system. The second tool may be a display editor used to build process graphic displays from a library of graphic display elements.

As mentioned above, further details regarding the operation of the two editors, or editing tools, and the manner in which properties and visualizations are defined, provided or assigned to elements, are set forth in the above-referenced, concurrently filed application. In one example, however, to add dynamic behavior to an element, the user may opt to add an animation and enter configuration information for the selected animation through dialog boxes and expression editors. To this end, the expressions may refer to the intrinsic properties of the element. For example, to specify a color change of a pump from blue to green when the pump is on, the user would apply a color change animation having an expression referring to the IsOn property of the pump in specifying which color to use.

The creation of a process graphic display is similar to the creation of graphic display elements, in the sense that the user may draw primitive graphical shapes (as described further below). The configuration engineer or other user may also select a composite shape from a library of previously defined composite shapes. The availability of such previously defined shapes may be shown in the panels 302, 304 described above.

In accordance with the object model framework, the above-referenced primitive shapes and composite shapes are based upon shape classes and composite shape classes, respectively, to enable their re-use via instances of the class. The use of such object classes provides for convenient parameter or other updates to each instance of the composite shape, updates that occur automatically via a modification to the respective shape class. Moreover, the ability to define additional composite shape classes using the aforementioned editing tools provides flexibility to this modular approach to defining the process graphic displays.

At the base or foundation of the graphics portion of the object model are shape object classes, each of which defines a respective primitive vector graphic entity. Generally speaking, the graphic depiction of each smart process object and, accordingly, each graphic display element, is composed of a set of shape objects, or composite objects formed therefrom, in accordance with the object model framework, the graphics and other configuration information for the objects being described in respective rendering definitions set forth in PGXML. In this manner, the process graphic objects described and shown herein may be constructed from primitive graphics defined by respective shape objects arranged as graphical building blocks. As described below, each shape object described in PGXML is later converted into corresponding XAML graphics objects (or other graphics formats, such as SVG) in preparation for rendering.

Each shape class may have a fixed set of properties or parameters. Changing the property values of an instance of the shape class, i.e., a shape usage, may result in a change in the graphical depiction of the shape. Properties may, for example, specify values for such aspects as size, position, color, line thickness, or transparency. Alternatively, or in addition, some properties or parameters of a shape class may change the behavior of the shape usage. Exemplary behaviors include enabling or disabling data entry, and hiding the shape or any part thereof. Parameters or property values may be assigned a fixed value or a dynamic value. For dynamic values, a value formatter object (described in further detail below) is created to establish and maintain the general manner in which the value is determined by, for instance, defining a reference and/or path string. A shape's properties or parameters may therefore obtain values from the properties of other shape usages. The shape may further define dynamic behaviors related to calculations or transformations to be performed on such values.

Shape classes may also define events that trigger the execution of script commands (also set forth in connection with the shape class) or, in some cases, a command defined globally for the user interface (e.g., a right-click selection to display a user interface menu). Events may involve the selection of the shape or other user action or, alternatively, involve a programmed reaction to a property value change.

As graphics building blocks, shape classes form the foundation of, or basic infrastructure, for process graphic displays and composite shape classes. More specifically, a shape object may be used within a display or a composite shape, an instance of which may be instantiated as a graphic display element. Shape objects defined in the object model framework include, for example, the following primitive shapes: rectangles; circles; ellipses; lines (single and multi-line); polygons; and, paths. Further types of shape objects include the container shapes, such as symbols. Symbols may be used to represent nodes, or icons, in a process shape hierarchy that may be used to depict hierarchal relationships between different graphic display elements and process graphic displays. For example, the configuration and runtime environments may provide a user with an option to display the hierarchy using such symbols in the panels 302 or 304. The symbols may then provide a convenient visual indication of the nature (e.g., display, display element, element attribute, etc.) of the node in the hierarchy. For example, a shape icon for a display may include a miniature depiction of the plant, while a shape icon for an attribute or property of an element may be a small circle. A shape icon for a container (e.g., group and composite) may be a folder, while a group of items in the hierarchy may be shown as a pair of overlapping squares. Other shape icons that may be used include a generic picture with a paint brush to signify a bitmap, and a generic display with an overlaid link to signify a link to external shapes, such as documents. Further shape objects include types of text shapes, such as text and text paths (i.e., a graphic element that understands runtime paths to establish a data location within the runtime environment). Still further, shape objects may be reference shapes, such as a link or other reference to an image, an HTTP or other link, or any one of a number of user interface shapes, such as buttons, check boxes, sliders, etc.

For each shape object or group of shape objects, one or more attributes may be assigned. Exemplary attributes include tool tips (i.e., a small box appearing in association with the shape object that provides a description or other information for the shape object when the mouse pointer or other selection mechanism is hovered over the shape), a context or other menu (e.g., a drop down menu from which a help file may be launched), a drag/drop behavior definition (e.g., details regarding the assignment of a tag), and zoom and span definitions.

Shape objects, shape properties, and groups of shape objects may also have behaviors associated therewith. For example, a shape object may have action- or alert-based behaviors in response to data received from a data source (as described further below). Conditional behaviors (e.g., if-then-else, switch, etc.) and other behaviors may also be defined via custom scripts. The behaviors may be defined via code in the form of scripts set forth in association with the shape object, and may utilize any desired programming language, such as C#. The instructions set forth via the script may then be implemented at runtime to update properties and parameters of the shape object or composite shape object, thereby modifying the appearance of the process graphic display.

In addition to adding attributes or behaviors, the configuration application 38 generally provides the configuration engineer or other user the capability to perform a number of actions on shape objects and groups of shapes. For example, the configuration application 38 may support create, copy/paste, move, replace, resize, and other functions typically provided in graphical user interface environments. Any static shape, or grouping of shapes, may also be converted to a dynamic shape in anticipation of the capabilities of the underlying XAML framework. For example, a user may define a conveyer group, convert the group to a dynamic group, expose or assign parameters related to the animation of the conveyor, and add script to define the movement of the conveyor. The configuration application 38 may also support the addition of a listener behavior that registers an event and specifies an action to be taken upon occurrence of the event (e.g. the pressing of a button). Still further actions that may be taken in connection with a shape object or group of shapes are the loading of a URL or XAML script, or any of the general user interface commands such as print and view changes (e.g., move to front or back, move one forward or backward, etc.).

Shape group objects may be created or associated using a selection or other tool provided by the configuration application 38. The selection tool(s) may also be used, for example, to define which shapes are to be made dynamic or, more generally, to select one or more shapes to assign any other functionality. The selection tools may also be used to expose or view attributes of shape objects in connection with binding the object to an input or output data source. Further information regarding data binding is described herein below.

Shape objects may be combined to form custom or configured groups of shapes, or shape group objects, and saved as part of a library for later use in another process graphic display either singly or as part of a composite shapes. In such cases, the previously created shape group or composite may be selected and dragged from a pallet section of the user interface (e.g., the aforementioned library or template section 65 or pallet section 308) into a canvas section (e.g., the configuration section 65 or section 306) that acts as a work area for the creation of new process graphic displays or graphic display elements, such as new groups of shapes or composite structures.

The above-described shape objects are instantiations of the shape classes that form a foundation of the object model framework. When shape objects are combined to form composite shapes, a corresponding composite shape class is defined. An exemplary user interface system may include a library of any number (e.g., 100) of pre-defined composite shape classes to support the modeling of a particular plant. The flexible, modular aspect of the disclosed user interface system supports modification of the library to, for instance, define new composite shape classes, as desired. The modular nature of the user interface system allows these shape classes and composite shape classes to be applied and re-used in the creation of the many displays (e.g., 1000) that may be needed to comprehensively represent the process plant. Re-use of the composite shape classes by configuration engineers or system designers may advantageously involve the construction or creation of more complex composite shapes therefrom in a nested arrangement, thereby creating another composite shape class for future instantiation in any number of displays. As described herein, a subsequent modification to the parameters, attributes, behaviors, etc. to a composite shape class automatically updates all of the displays having a graphic display element (i.e., an instance) of the modified class. To this end, each composite shape class may have, in its PGXML description or via an associated list, table or other identification, each instance of the class identified so that the automatic propagation of changes may be made in connection with the saving, storage or other recordation of the composite shape class object.

Figure 12:
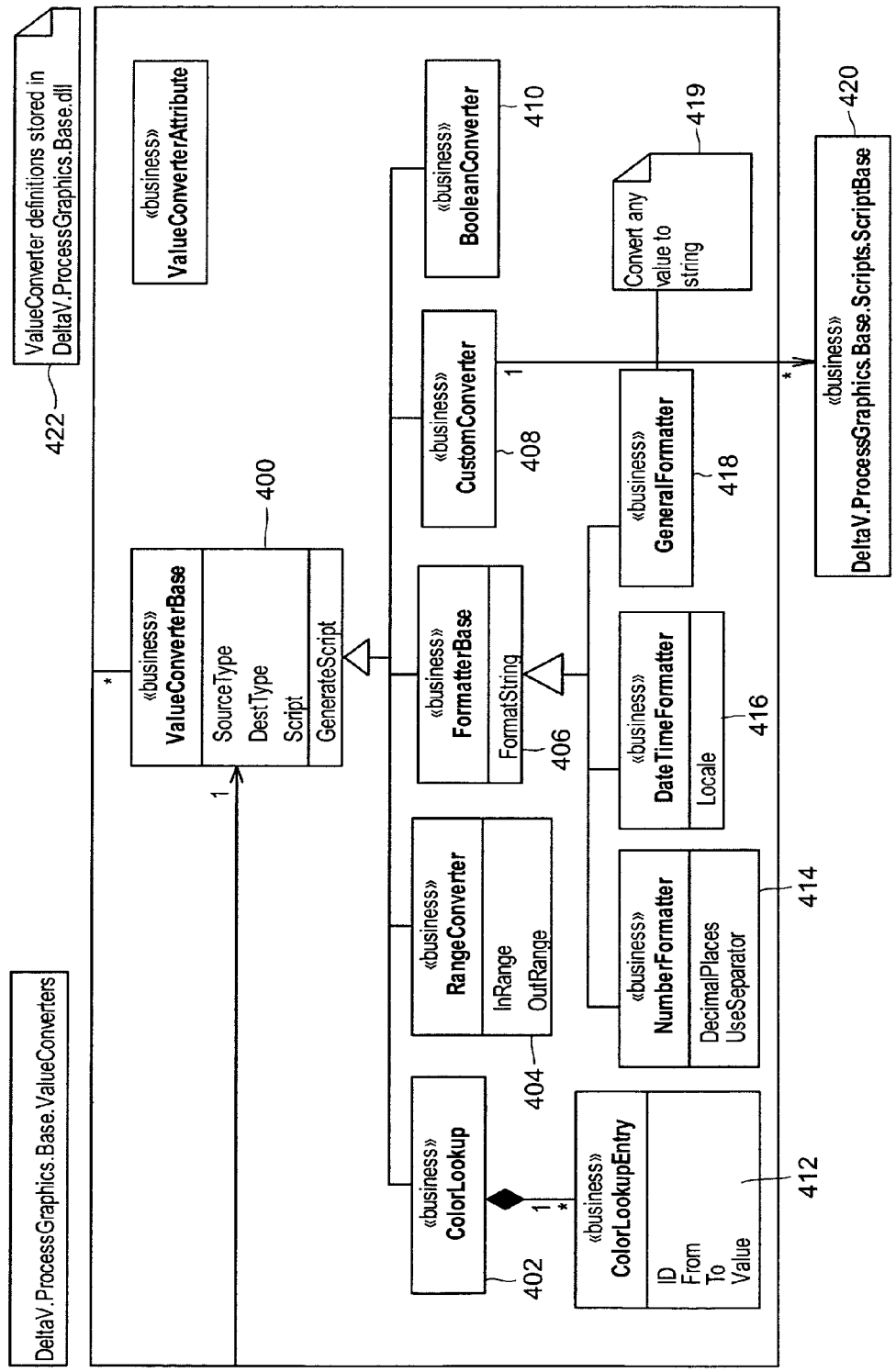
FIGS. 12-14 are simplified representations of respective portions of an object model framework set forth in a class diagram identifying relationships between classes of the object model framework.

With reference now to FIG. 12, the object model framework utilized by the user interface system may also define a number of classes directed to other aspects of the configuration and runtime environments. These classes may, for instance, be utilized in defining aspects of process graphic displays, composite shapes, and data sources for displays and elements thereof. Specifically, FIG. 12 shows only a small, exemplary portion of the object model framework dedicated to specifying data conversion methods. As described above, a smart process object may dynamically display a data value in a number of ways, including, for instance, a bar or color change. When configuring a graphic display element, whether a specific instance or a template, a value converter attribute may be added thereto. In this example, the data may be converted in accordance via one of five different conversion methods specified by corresponding sub-classes of a general ValueConverterBase class 400: ColorLookup class 402, RangeConverter class 404, FormatterBase class 406, CustomConverter class 408, and BooleanConverter 410). Each respective class may have any number of parameters or attributes that will be specified upon instantiation (see, e.g., the InRange and OutRange parameters of the RangeConverter class 404). The ColorLookup class 402 may correspond with a smart process object behavior that causes a color of the object to change in accordance with a current data value. For example, a tank may have a fluid depicted therein via a color to indicate when the fluid level is appropriate (e.g., green), dangerously high (e.g., red), or inappropriately low (e.g., yellow). The specification of the various fluid levels and other information necessary to implement these color changes may be set forth via a sub-class owned by the ColorLookup class 402, namely a ColorLookupEntry class 412.

With continued reference to FIG. 12, the FormatterBase class 406 has a number of sub-classes specifying different types of possible data formatting methods catering to different data types. Examples include a NumberFormatter class 414, a DateTimeFormatter class 416, and a GeneralFormatter class 418, which may be related to converting the data value to a string for display, as noted in a block 419. The class diagram shown in FIG. 12 may also indicate a relationship between classes via a line connecting two classes, such as the relationship between the CustomConverter class 408 and a DeltaV.ProcessGraphics.Base.Scripts.ScriptBase class 420, which may provide a user with an opportunity to specify custom script or other commands to implement custom instructions for, in this case, formatting the data.

FIG. 12 also notes in a block 422 that definitions of instantiated objects of the above-described classes may be stored in a dynamic link library (DLL) file created in preparation for downloading the process graphic display to a workstation for implementation of the runtime environment. The DLL file may set forth the definitions of the formatting and other methods to be executed when the process graphic display is rendered. To this end, the DLL file may include instructions compiled from, for instance, C# code. The C# or other code may, in turn, have been generated at the point that the process graphics information is converted into XAML script.

Figure 13:
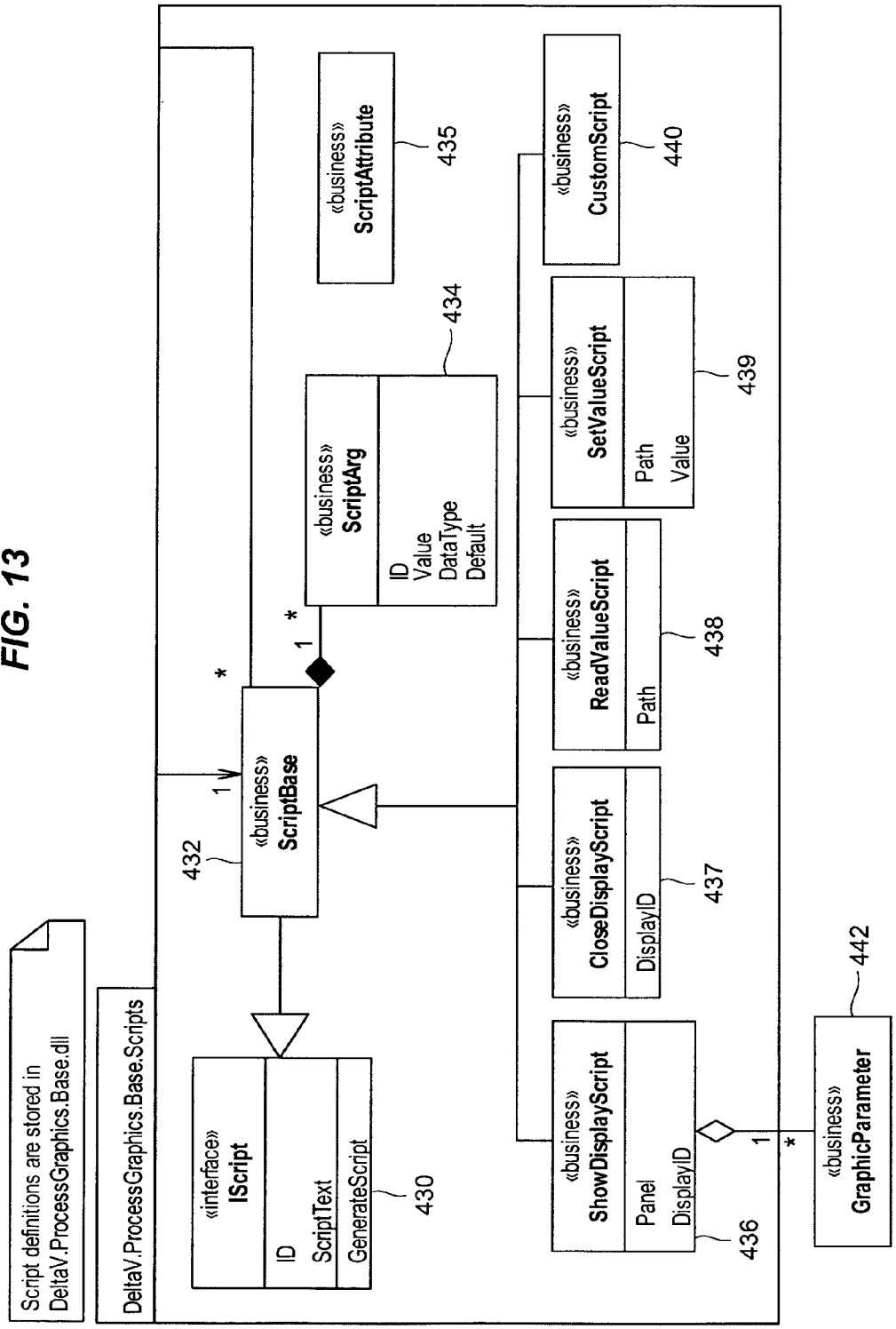

FIG. 13 shows another portion of the object model framework corresponding with a class diagram directed to exemplary behaviors or actions that may be specified for a graphic display element. Each available behavior or action is specified via script instructions, and the object model provides a framework for specifying the instructions in object-oriented fashion rather than as a block of unorganized, instance-specific code. In this fashion, the instructions may be conveniently reused and customized. One exemplary behavior to be defined via objects of these classes may involving a user pressing or actuating a button of a graphic display element, such as a panel graphic that provides a switch option having an on/off toggle. The panel element may then utilize an IScript class 430 to generally identify the behavior, which in turn has a ScriptBase sub-class 432 owning a ScriptArg class 434 and a ScriptAttribute class 435 to identify a number of arguments or attributes, respectively, to be utilized in the script instructions to be defined. The ScriptBase sub-class 432 has, in turn, a number of sub-classes 436-439 to specify a number of pre-defined actions (e.g., showing a display, such as a faceplate panel) and a sub-class 440 to specify a custom script. One or more of the sub-classes specifying pre-defined actions may have one or more respective sub-classes to define parameters or other aspects of the action to be implemented (see, e.g., the GraphicParameter sub-class 442).

Figure 14:
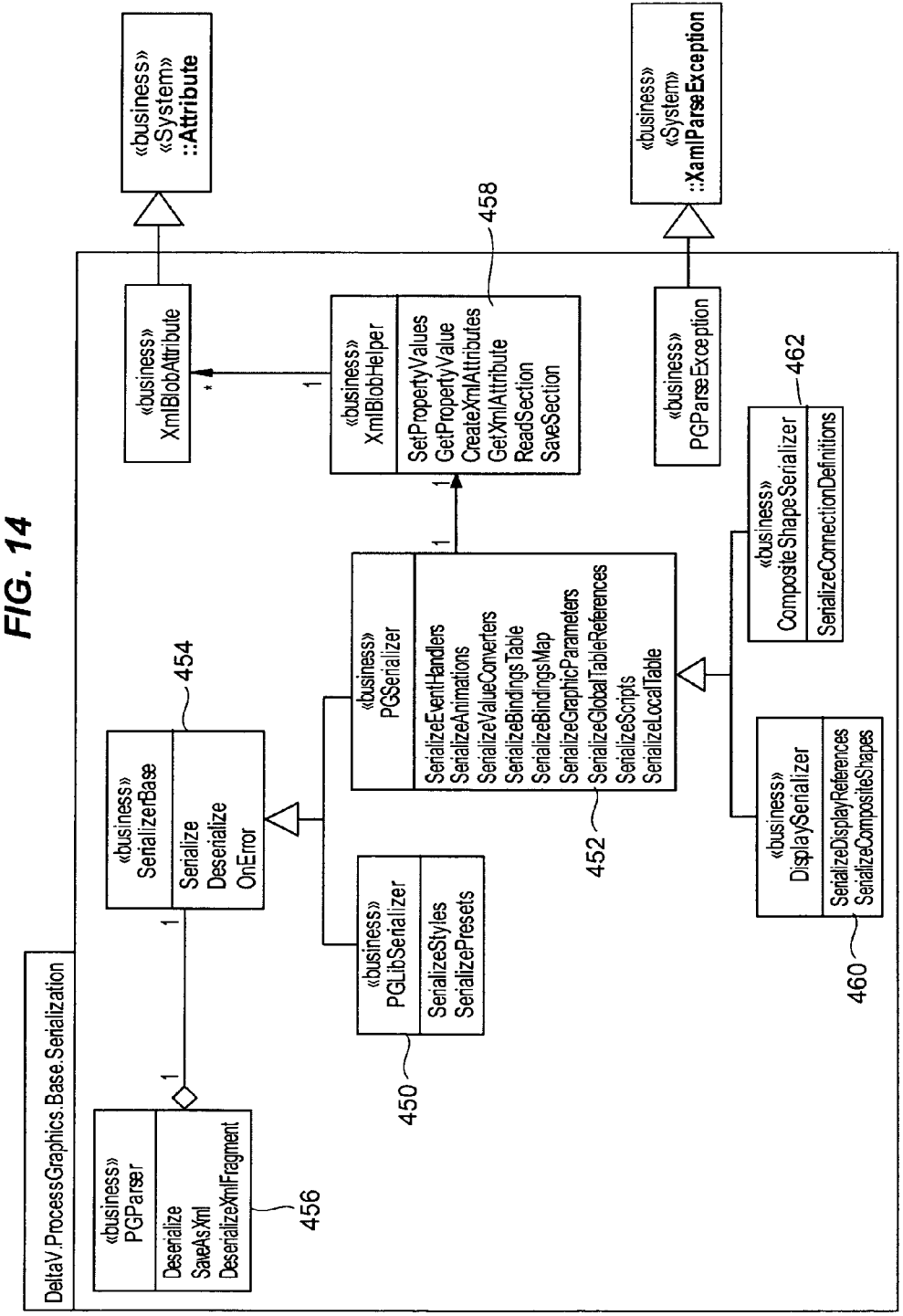

FIG. 14 shows yet another portion of an exemplary object model framework. This portion is directed to defining serialization objects that, in some embodiments, may be utilized to support the move from the configuration environment to the runtime environment. Specifically, a number of classes are defined to specify actions taken by the user interface system for serializing (or, in other portions of the class diagram, de-serializing) other objects that define the process graphic displays. When implemented, these classes may form a part of the configuration application 38 that converts the representations of the graphic structures being created in the editor into PGXML script (serialization), as well as part of a conversion engine, program or other tool that may process the PGXML script (de-serialization). In either case, the exemplary framework and objects shown in FIG. 14 represent only one mechanism or technique for generating or otherwise processing the PGXML script. More generally, the PGXML script generated during the configuration process is converted into, for instance, one or more files to be utilized during runtime generation (rendering) of the displays or, alternatively, to be utilized to generate other files used during display rendering (e.g., compiled files). Further details regarding the conversion process and the files generated therein are described herein below, but generally speaking, PGXML provides a neutral, initial (or base) format to support the use of any one of a number of different rendering engines and graphics object frameworks.

The objects being serialized specify or include XML-based content describing aspects of the process graphic displays and their constituent graphic display elements. In other words, the definitions of the displays and display elements that are described via the PGXML language are parsed in accordance with the processing steps specified via the classes shown in FIG. 14.

In the exemplary class diagram of FIG. 14, two different types of serializer function classes are specified, a PGLibSerializer class 450 and a PGSerializer class 452, each of which are sub-classes of a SerializerBase class 454 that generally identifies the type of serialization operation to be implemented (i.e., Serialize, Deserialize, OnError). Also included is a PGParser class 456 to define an object that implements a deserialization of an XML script fragment or other script fragment to be saved as XML script.

Serialization processing steps taken in accordance with the PGSerializer class 452 are further specified via attributes established in an XMLBlobHelper class 458, as well as via a DisplaySerializer sub-class 460 and a CompositeShapeSerializer sub-class 462.

The classes and sub-classes specified in FIG. 14 represent only a subset of the processing steps that may be taken in preparation for downloading and implementing the displays of the runtime environment. Moreover, it should be understood that the object model and processing technique specified via FIG. 14 are exemplary in nature, and the PGXML script may be processed in other ways known to those skilled in the art of processing XML-based descriptions and script.

Figure 15:
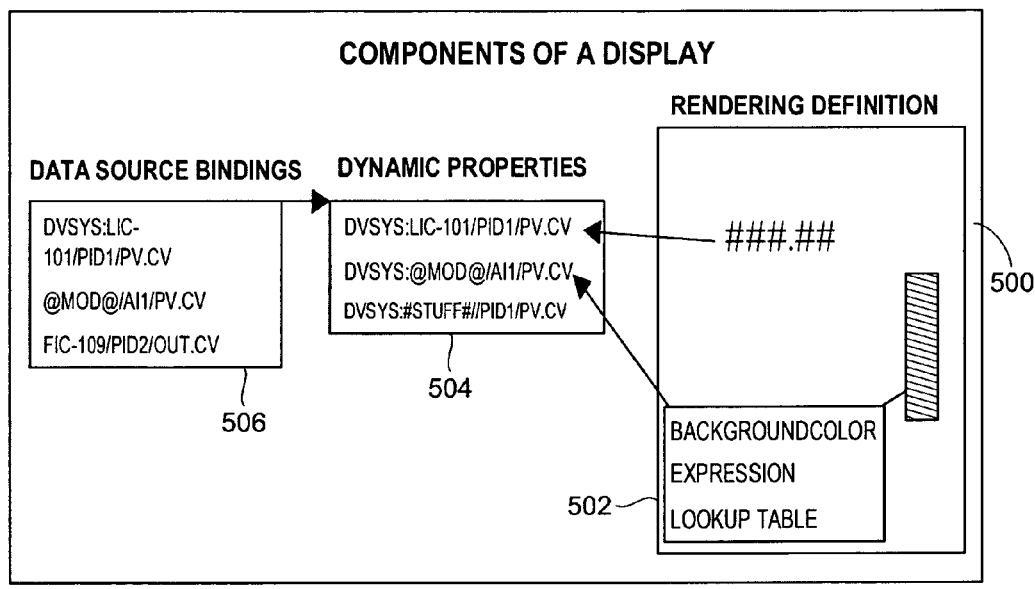
FIG. 15 is a schematic representation of the defining components of an exemplary process graphic display, including a rendering definition set forth in a declarative language.

With reference now to FIG. 15, a process graphic display 500 created in the configuration environment provides an exemplary view of its components prior to being converted or processed for execution in the run-time environment. After configuration, the display 500 includes a rendering definition 502 that includes the PGXML description of the graphics to be rendered. Because this portion of the PGXML script does not involve the functionality of the display 500, the rendering definition 502 corresponds with the portion of the display 500 that may remain unknown to the configuration database 28. Most of the data defining a process graphic display or element thereof may be stored in the configuration database 28 in an opaque manner, in which case the nature or details of the data are not known to the configuration database 28 or an index thereof beyond a general identification of the graphic display element to which the data pertains. Such data may typically define the graphics portion of the graphic display element in a discrete, or separate, manner from the remainder of the element definition.

Other portions of the display 500 are generally stored in the configuration database 28 to support tracking through a renaming step implemented by the user after the configuration. More specifically, such portions may include a property reference table 504 that ties a property reference in the rendering definition 502 to a usage property or parameter. A generic example is shown in FIG. 15 for a reference having a placeholder ###.##, where the usage parameter is identified as DVSYS:LIC-101/PID1/PV.CV. The reference table 504 may further include specifications of scripts and events in addition to the dynamic properties shown in FIG. 15. As described below in greater detail, the properties or parameters of the usage are, in turn, tied to a data source in a data bindings table or list 506. The data source may be specified via a data path or location information, such as FIC-109/PID2/OUT.CV, which, in this example, specifies a data location for information to be received from the process control system (although other data sources both internal and external to the network 10 may be used). The data bindings table 506 may provide a list of all of the data source references for the display 500. The data sources may be identified via aliases that are resolved by the configuration application 38. As described above, the display 500 may further include one or more value formatter objects (not shown), each of which having tokenized expressions that contain associations to other objects and property references for the formatting of content to be displayed. The display may also include data source references that establish additional ties to database objects, and references to a usage's composite shape classes.

Figure 16:
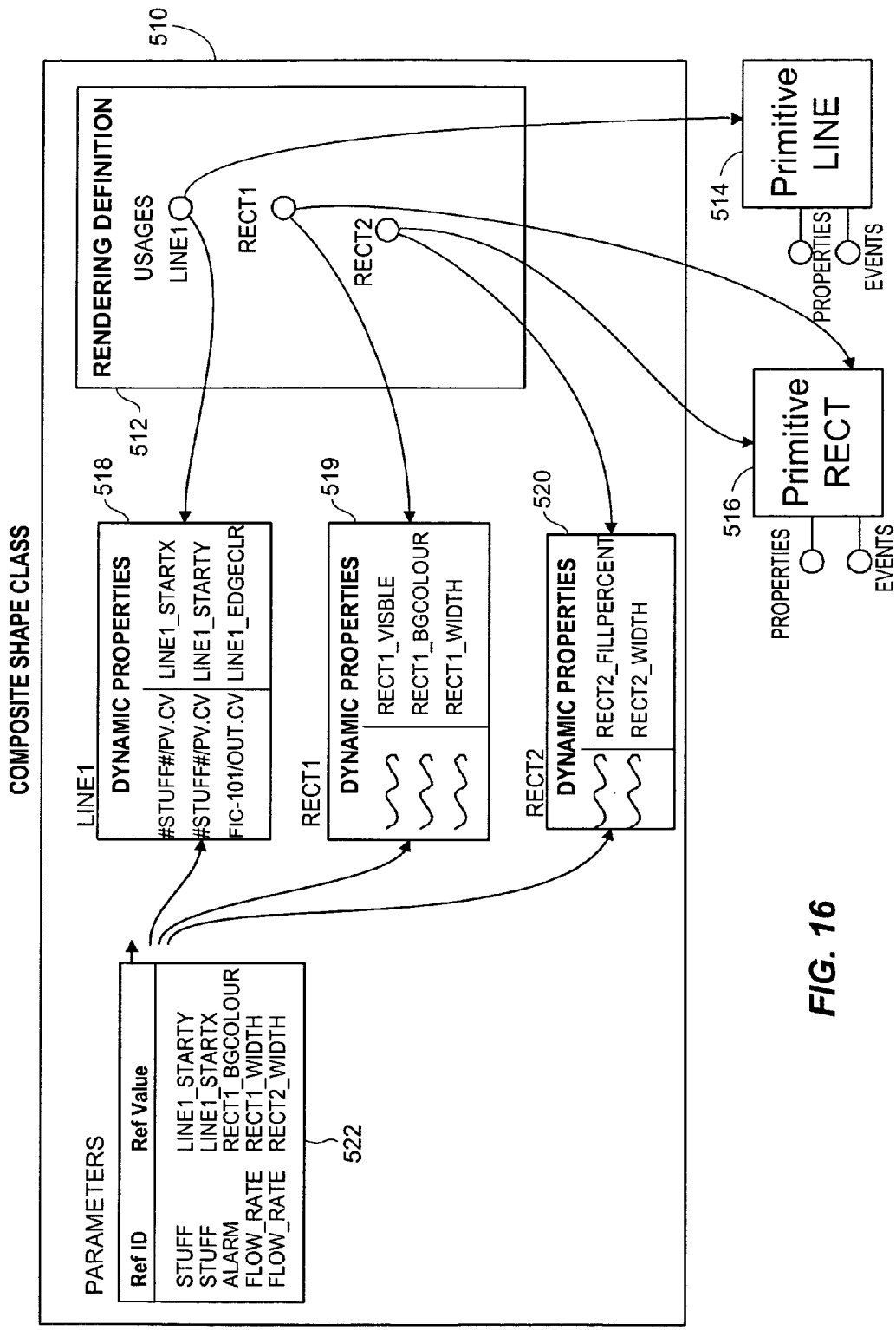
FIG. 16 is a schematic representation of the defining components of an exemplary composite shape class that may be used in creating and configuring a process graphic display.

The display 500 is a simplified display in the sense that generally a number of different elements of the display will require dedicated property reference tables and data source binding lists. To begin to illustrate the potential complexity addressed via the modular approach to defining displays, FIG. 16 shows the components of an exemplary composite shape class 510 that may be used in a more typical display. Of course, the composite shape class 510 may be utilized to create more complex composite shape classes, the usages of which may then be involved in building a display. As described above and shown schematically in FIG. 16, the composite shape class 510 is created from shape usages, Line1, Rect1, and Rect2. The composite shape class 510 includes a rendering definition 512 that relies upon shape classes 514 and 516 for the line and rectangular shape usages, respectively. Generally speaking, the shape classes 514 and 516, as well as the composite shape class 510, may have a number of properties and events. When a property is dynamic, a reference path for data to support the dynamic graphics may be resolved via association with a shape's property, resolved via an alias, or resolved through the use of a script. In any case, the properties of internal usages may be exposed as a parameter to be configured by the user of the display editor in the configuration application (see, e.g., the panel 318 of FIGS. 6-9), such that the property may be configured when the composite shape class is used within a display or another composite shape class.

Like the display 500, the composite shape class 510 may be separated into the rendering definition 512 and one or more reference tables 518-520. While the details set forth in the rendering definition 512 may be unknown to the configuration database 28, items to be tracked may be pulled out of the PGXML script defining the composite shape class to become entries in one of the reference tables 518-520. Each entry in a reference table may have an associated value formatter entry in the configuration database 28. The value formatter may contain assignments to properties or parameters, which may contain specific data source references or be left for later binding when a composite shape usage is created from the composite shape class.

As noted above, the names of composite shape usages of a composite shape class may be stored in association with the class, such that a modification to the class is carried forward, or propagated, to each of the usages. Similarly, graphic parameter usages may be stored in association with the definitions of the graphic parameter. The value formatter may also include scripts and events for the parameter or property. These data items may be stored in reference or other tables similar to the reference tables 518-520.

The composite shape class 510 may also include a table 522 defining parameters created from the properties of, for instance, the shape class usages. More particularly, the table 522 correlates an alias (i.e., STUFF) to resolve all dynamic properties that refer thereto. Two other parameters are also defined to be exposed for the class, namely ALARM, which is tied to the BGCOLOR property of the usage LINE1, and FLOW_RATE which is tied to a width property of usages RECT1 and RECT2. When a composite shape is placed on a display, a usage or instance of the composite shape class is created in much the same manner that the shape class usages shown in FIG. 16 are created in connection with the composite shape class 510. The configuration engineer may then provide fixed or dynamic values for the parameters identified in the table 522.

As mentioned briefly above, composite shape classes may also contain linked or embedded usages of other composite shape classes. Such nested composite shapes may be useful when several shapes are combined together to form a generic composite shape class. The usage's properties or graphic parameters of the composite shape class usages may be partially bound with one or more aliases in the data source paths specified. As a result, a new parameter is created for each unique alias, thereby allowing the user to create a specialized but still reusable composite shape class that requires minimal configuration when placed on a display. In this way, more complex composite shape classes may be created from simpler composite shape classes. As an example, a composite shape class may be created for a limit indicator, which may involve the depiction of a triangular object having a corner positioned to point to, and therefore identify, a level on a bargraph. One or more instances of the limit indicator composite shape class may therefore be used in a level indicator composite shape class to identify various levels in, for instance, a tank.

The nesting of composite shape classes would be generally cumbersome if not for the capability of each object class to automatically update each of its respective usages or instances. That is, and as noted above, any change to the configuration of an object class, such as a composite shape class or a display class, automatically propagates throughout the user interface system, causing each instance of that class to reflect the configuration change.

The foregoing flexibility of the object classes may be combined with an aspect of configuration control provided by the runtime environment and, in certain cases as desired, the configuration environment as well. As described further below in connection with certain embodiments, a user in the runtime environment may generally be restricted from implementing changes to a composite shape class. This control over the class may be realized by only allowing the user to modify the appearance of a specific usage of the class through changes to the values or definitions of the usage's parameters. In this way, the user may only be permitted to change the data sources for the specific composite shape usage or instance currently shown, rather than the underlying graphics structure.

Figure 17:
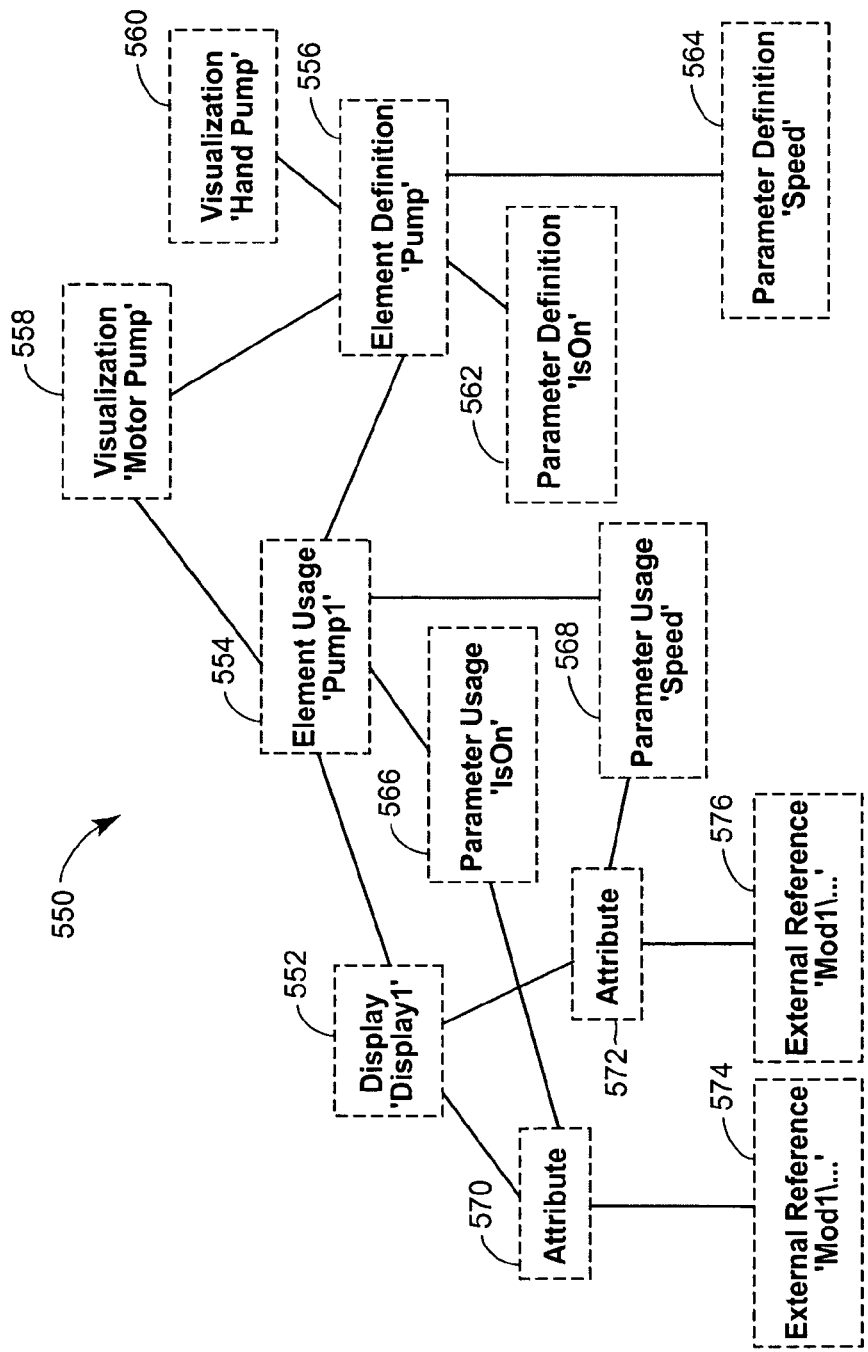
FIG. 17 is a schematic representation of a database storage instance diagram that identifies relationships between an exemplary process graphic display utilizing a number of composite shapes having defined parameters.

FIG. 17 is a schematic representation of a database storage instance diagram indicated generally at 550 that identifies the relationships between an exemplary process graphic display named Display1 and its subsidiary objects, data for all of which may be stored in the configuration database 28. As an initial matter, an object 552 for the display itself exists and may be stored in the configuration database 28. The object 552 may support the creation of a display class, if desired, that may be used in the creation of more complex displays. The display contains and utilizes an element usage or instance 554 of a composite shape class for a pump. The element usage 554 is named "Pump1" and may be further defined by an element definition 556 and alternative visualizations 558 and 560 for a motor pump and a hand pump, respectively. In this manner, an instance of the display 552 may depict one of the two available visualizations of the pump, as desired by the configuration engineer. The pump composite shape 556 has two internal properties made available as parameters to be configured, namely an IsOn parameter object class or definition 562 and a Speed parameter object class or definition 564. The usage 554 utilizes instances or usages 566 and 568 of the corresponding parameter definitions 562 and 564 to support the configuration of the pump usage 554. To further support the configuration of the pump usage 554 via the display 552, the display 552 includes two attributes 570 and 572 that are linked to the pump parameter usages 566 and 568, respectively. In this particular example, these attributes 570 and 572 of the display 552 have already been specified by, for instance, the configuration engineer via the panel 318. Specifically, the display attribute 570 has specified that the IsOn parameter is bound to a data source 574 having a path or location "Mod1/ . . . " (the full name of which is truncated for convenience). Similarly, the display attribute 572 has specified that the Speed parameter is bound to a data source 576 having a path or location "Mod1/ . . . " (the full name of which is also truncated for convenience). In this manner, the intrinsic properties of the pump are bound to control runtime variables, the values of which will be depicted in the runtime environment's generation of the display 552.

As shown via the foregoing example, parameters may constitute user-specified configuration items for a display that are made available in one of the above-described editors during the configuration of a display instance, or even during runtime in, for instance, off-line situations where a parameter may be changed to modify a simulation. Alternatively, the graphical aspects and other properties of a graphic display element may be specified in the configuration environment as properties of an object class, such as a composite shape class, such that the object is completely defined without the need for any further specification of parameters to support, for instance, dynamic behavior during runtime. For example, the properties of a composite shape class for a static element, such as a static shape having a static color, may be fully established via the internal properties of the class. When such properties are not static, however, the PGXML definition of the graphic display element defines a reference to a parameter to be later established during, for instance, configuration via the editor. In this way, the object class properties may lead to graphic display parameters in support of advanced, dynamic graphics.

Figure 18:
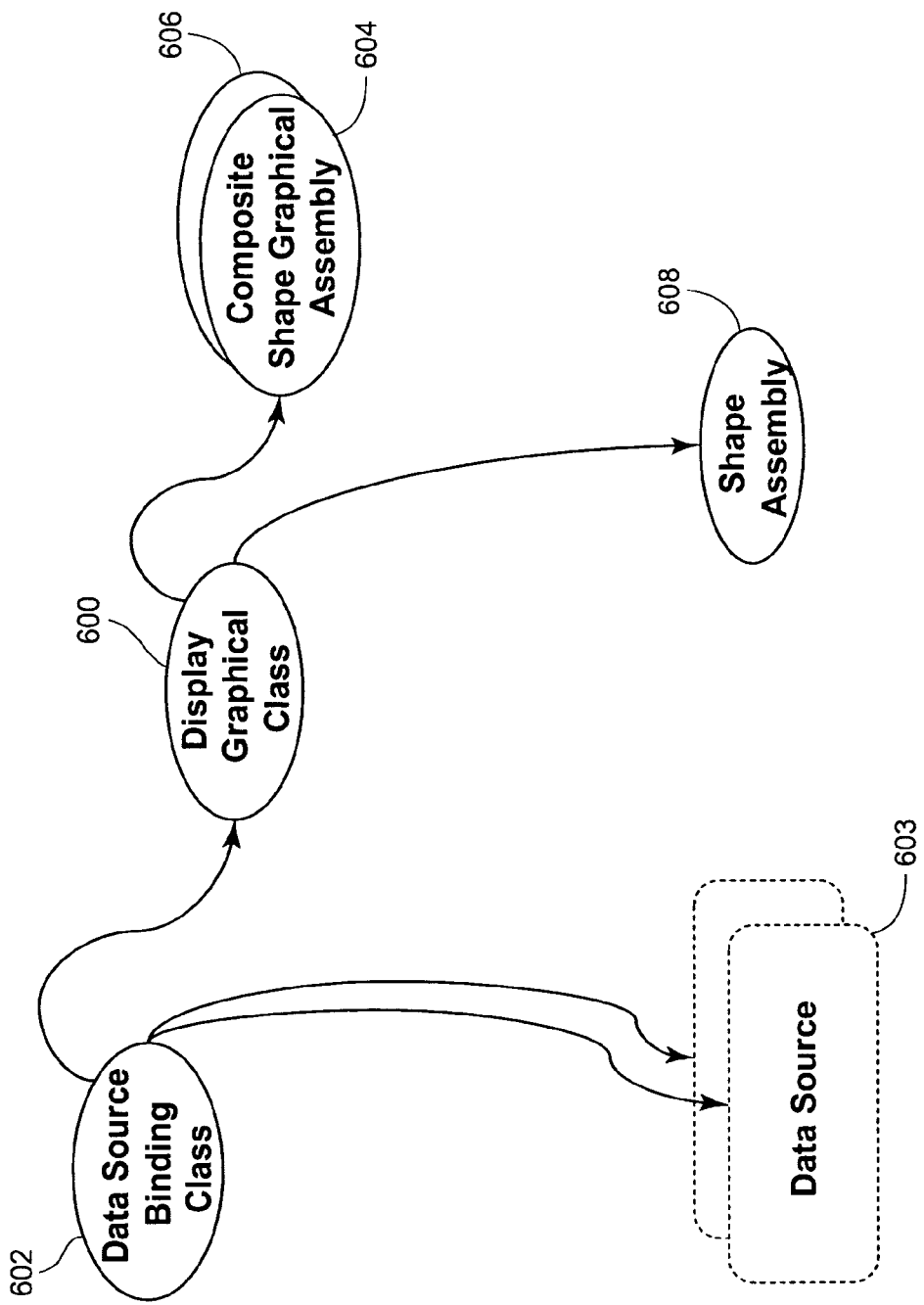
FIG. 18 is a schematic representation of assemblies created in connection with the generation of a runtime process graphic display from the configuration environment components described in connection with FIGS. 15 and 16.

FIG. 18 is a simplified representation of the manner in which the configuration information generated during the configuration environment is processed, in accordance with certain embodiments, in preparation for implementation in the runtime environment. Generally speaking, a number of assemblies are created from a display instance or usage, the configuration information of which is set forth as a PGXML rendering definition. From each display's rendering definition, a display graphic class assembly 600 is generated. The assembly 600 generally includes and defines both graphical and non-graphical aspects. For instance, in an embodiment utilizing Microsoft Avalon vector graphics, the graphical aspects of the rendering definition are converted into XAML script, while non-graphical aspects relating to, for instance, data conversions and event handling are set forth in code-behind instructions (e.g., C# code). These components may then be compiled into the display graphic class assembly 600. Other embodiments may convert the PGXML definition into other graphics formats, such as SVG.

As described above, the display may contain instances of both composite shape classes and shape classes. While these usages may be converted into Avalon controls and have their own assemblies (as described below), the properties of the display, shape and composite shape usages that are bound to process control data may be linked or bound to a property defined in a separately generated assembly 602, which may be referred to as a data source binding class. In some embodiments, the display graphic class assembly 600 and the data source binding class assembly 602 are combined into a single assembly. The data source binding class assembly 602 may contain a specification of the generated bindings to all of the data source references (shown schematically as data sources 603) implicated by the display instance, as well as all of the corresponding links to the display class. In this sense, the assembly 602 and data sources 603 include all of the data source references for the display and its constituent composite shapes and other shapes.

Each PGXML rendering definition of the composite shapes utilized in the display are processed into separate assemblies 604, 606. In some embodiments, instances of composite shape classes that are linked or otherwise related may be grouped into a single assembly dedicated thereto, such as the assembly 604. Similarly, the total number of assemblies created may be reduced by processing all of the embedded composite shape classes into a single separated assembly, such as the assembly 606. In view of the embedded nature of the composite shapes involved, the display assembly 600 and the assembly 606 may be combined for optimization.

Shape Classes utilized in the display are processed into respective assemblies, such as a shape assembly 608, separate from and external to the generated display and composite shape class assemblies. The shape classes assembly(ies) may be pre-built in cases where the shape classes are pre-defined to avoid having to generate and download them. That is, when shapes are pre-installed on a system, their respective assemblies may be loaded from a workstation having the configuration application, or downloaded from the configuration database 28, to each of the workstations or other display devices that will be generating a depiction of the display having the shapes. While certain embodiments may provide the flexibility of adding (i.e., building) new shape classes, the resulting shape assemblies may be added when the other assemblies for a display are downloaded, thereby avoiding a reinstallation on the operator workstations or other display devices. The shape assemblies 608 may be generated from respective rendering definitions set forth in PGXML or, alternately, in code instructions set forth in, for instance, C#.

Figure 19:
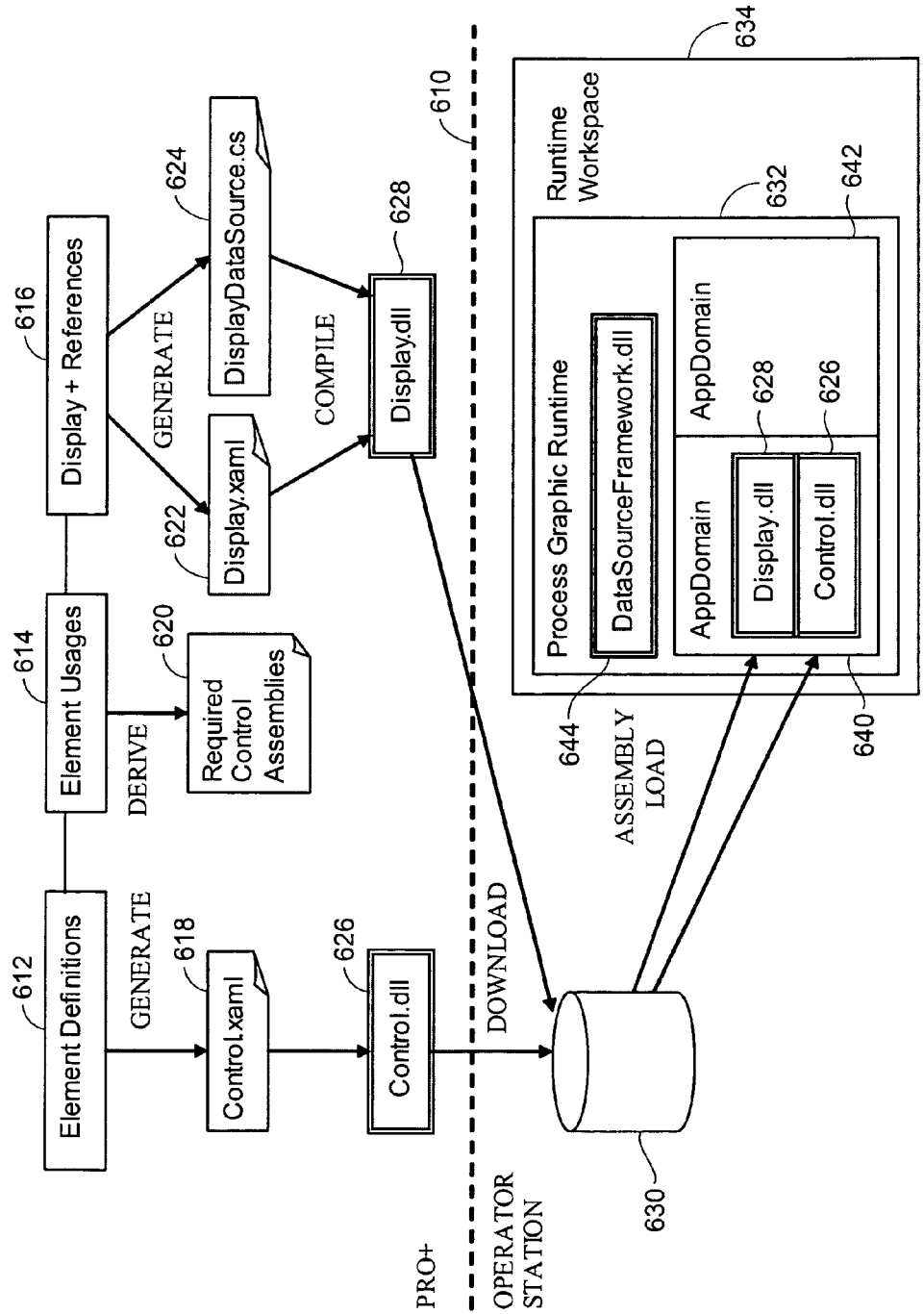
FIG. 19 is a further schematic representation of assemblies, files and other items created in connection with the generation of a runtime process graphic display; and, FIG. 20 is a schematic representation of a data source object model portion of the object model framework for an exemplary data source.

FIG. 19 shows the processing steps involved in the conversion of PGXML configuration information into control assemblies, such as those assemblies discussed in connection with FIG. 18, as well as the compilation and other processing of such assemblies into files for deployment to a runtime implementation. Such processing generally occurs after element and display configuration is complete, and the resulting data is stored in the configuration database 28. Generally speaking, the processing and deployment steps shown in FIG. 19 may be executed by a conversion engine or other tool implemented by one or more computers, processors or other devices in the network 10 capable of such processing. In one embodiment, the processing steps taken by the conversion engine or tool are primarily executed by a Pro+ workstation, which may, but need not, also provide the user interface for the configuration application 38. However, the exemplary embodiment of FIG. 19 provides one possible division of responsibility between two workstations involved, where a dividing line 610 generally designates the respective tasks and file locations associated with a configuration workstation (e.g., the Pro+workstation used in connection with DeltaV installations from Emerson Process Management) and an operator workstation.

The process graphics deployment strategy steps shown in FIG. 19 are based on a Microsoft Avalon (XAML) implementation, although, in other embodiments, other graphic schemes may be utilized. For instance, to obtain the scalable vector graphics advantages of XAML, the SVG format may be utilized, in which case the deployment steps would be similar but not identical to those shown in FIG. 19 due to the manner in which the SVG script is processed and implemented.

As described above, the process graphic displays and graphic display elements thereof (i.e., shapes, composite shapes, and subsidiary displays) are created and configured using the configuration application 38 and, more particularly, one or more graphic editors or editing tools. The displays and elements are described via the above-described object classes, such that each element is defined by a respective element definition 612 and element usage description 614, and each display is defined by a respective display definition 616. Each definition or description may be set forth in PGXML script (particularly the definitions 612 and 616), and therefore includes a rendering definition to be converted into the XAML graphics format. To that end, each element definition 612 is converted into a XAML file 618 (e.g., control.xaml) that sets forth Avalon controls directed to rendering the graphic structures defined for the element class. Similarly, one or more control assembly files 620 are derived or generated from the element usage definitions 614. It should be noted that, while the data binding and other information stored in connection with the element usage descriptions 614 may be set forth in reference tables or lists, as described above, such information may also or alternatively be set forth using PGXML descriptions.

With continued reference to FIG. 19, graphics portions of the display definition 616 are also converted to XAML script 622, which may be set forth in a separate file (e.g., display.xaml). The other portions of the display definition 616 may be processed to generate one or more additional code-behind files 624 that contain instructions involved in implementing dynamic aspects of the display, including specifying the underlying data sources and events giving rise to such aspects. More particularly, the code-behind file 624 may include a custom data source list that identifies each of the references utilized in the display. The list of referenced elements may be used to decide which control assemblies to download with the display.

The Avalon controls and other XAML script files, such as the display file 622, may then be compiled to support the runtime environment. In this embodiment, the compilations result in one or more dynamic-link library (DLL) files that set forth the rendering and other commands to be executed at runtime. A first DLL file 626 may set forth commands for rendering the XAML controls for the graphic display elements, while a second DLL file 628 may be directed to the commands for depicting the display. In other embodiments, the compiling step may not be necessary due to the manner in which graphics instructions are rendered.

The compiled versions of the control and display assemblies may then be downloaded or otherwise transmitted to any number of workstations or other display devices on which the process graphic display is to be rendered. In this exemplary embodiment, the files 626 and 628 are downloaded to a memory 630 that may, for instance, be part of an operator workstation or shared among a number of workstations. When the process graphic display is to be depicted, a process graphic runtime application 632 creates a runtime workspace 634 utilizing a computer-readable medium in which the execution and other processing of runtime instances 636 and 638 of the DLL files 626 and 628 may be implemented, respectively, to render the process graphics display. Specifically, the runtime workspace 634 may include one or more application domains 640 and 642 utilized in the Avalon framework for execution of applications. The DLL files 636 and 638 are then loaded into one of the application domains 640 to generate a user interface pane configured to show the display. To this end, a display data source file 644 is accessed or activated and the display is rendered utilizing the data gathered from the sources identified in the file 644. The data source file 644 is a custom data adapter that effectively connects the Avalon graphics to backend data sources, such as the process control system.

Generally speaking, if a display or composite shape is to contain dynamic behavior on one or more properties, then these properties must be bound to data from the control system or some other source. This data link is referred to herein as data binding. Data bindings may have two components: an identification of a data source and a data source reference. In a simple case the bound value is fully qualified, meaning, the bound value resolves to a specific data source hardcoded in, for instance, the PGXML script defining the class. A data source identification may include a path name, such as "DVRT:LIC-101/PID1/PV.CV." When the display is rendered or run, the data will be retrieved via the data binding for display via the formatting and other graphics details specified in connection with the bound parameter. In this way, when the value changes, the display will change, thereby establishing the display's or display element's dynamic behavior and providing a continuous manner of communication (i.e., a communication link) between the rendered display and the data sources. Examples of data sources include a process control system runtime system (e.g., DeltaV runtime, DvRt), a process control historian, process control system events and alarms, process control system diagnostic data, and other external systems, such as Ovation, Provox (POC), OPC, and AMS.

Figure 20:
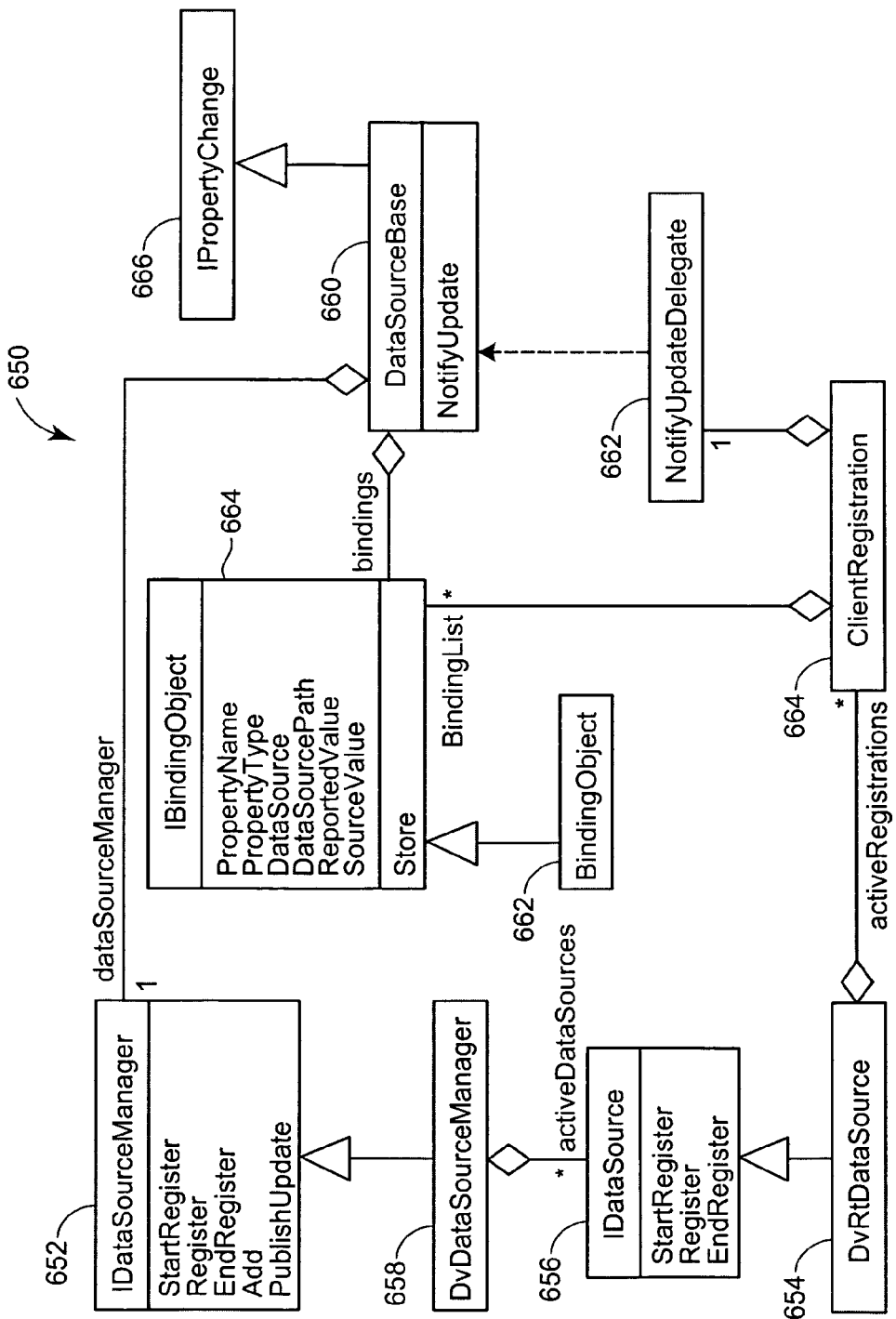

FIG. 20 is a schematic representation of an exemplary data source object model portion 650 of the object model framework to support the above-described data source functionality. Generally speaking, and as described above, a custom data source is generated for each process graphic display. In a display containing a pump having an IsOn parameter reflected via a color change, the configuration engineer or other user may configure the IsOn property of the pump to bind to an item on a path in a data source, such as a path beginning with 'MOD1 . . . ' of the process control system. When the XAML or other process graphics rendering script is generated prior to the downloading to the operator workstations and other display devices of the runtime environment, the pump instance may then contain a bind statement referring to an intermediate variable name. The custom data source may also be generated (or modified) to include a property with the same name. To these ends, and as shown in FIG. 20, the data source object model 650 may include a data source manager object 652 for typically several registered data sources. In this simplified example, only a single DvRt data source object 654 is shown, which may represent the use of the process control system as the data source. The DvRt data source 654 and other control system data sources are organized as sub-classes of an IDataSource class 656, which may specify register (or memory storage location) information for the data source path expressions. The active data sources organized under the IDataSource class 656 are, in turn, under a DvDataSource manager 658 dedicated to managing the control system portion of the data sources managed under the IDataSourceManager class 652.

The custom data source for a display is derived via a DataSourceBase class 660 that has access to the DvRtDataSource class 654 via objects in a notification class 662 and a registration class 664. Objects of the DataSourceBase class 660 may be generated using the references extracted from the display. A binding object 662 of an IBindingObject class 664 is added to the data source for each reference in the display. An IPropertyChange class 666 may also be utilized in the processing of the custom data source for the display.

Utilizing the custom data source, the Avalon (or other graphics) controls derived from the PGXML script may data bind dependency properties to a data source. In so doing, the value of the dependency property is provided by the data source at runtime, and changes to the underlying value are then reflected in the dependency property. If the user provides a new value, this is automatically pushed in the data source.

The path for the data value to be retrieved from the data source may be referred to herein as the data source reference. The data source reference syntax may be different between several different embodiments having, for instance, different control systems or other types of data sources. In some cases, the data source reference may have a property to indicate the format or syntax, such as alphanumeric or float. Examples of data source references for the commercially available systems noted parenthetically include LIC-101/PID1/PV.CV (DeltaV), and POINT/PARAMETER. FIELD (Provox). As described above, combining the data source and the data source reference allows the runtime workspace to obtain data value(s) used to drive the dynamic behavior in a display.

When a property is bound to a process control data value a "Value Formatter" object may be created at configuration time. The Value Formatter object may specify the details of the binding, such as the usage and property, or parameter, that is bound, and the data source, and data source reference. Alternatively, or in addition, the Value Formatter may include additional data, such as formatting, data conversion (lookup tables, linear, range, or scripted functions), error handling, refresh rate, and a minimum value change.

In some embodiments, one or more lookup tables may be stored in the configuration database 28 to assist in data binding. For example, the Value Formatter objects may be associated with a lookup table at configuration time. The lookup tables may be downloaded to the workstations and a data source extension for global variables and lookup tables may be provided. Such lookup tables may be shared between displays and downloaded independently of the displays.

As described herein above, the data binding of parameters and other information set forth and defined via PGXML descriptions supports advanced, dynamic graphics having animation tied to, or controlled by, the process plant data to which the graphics pertain, in a flexible, extendible, and configurable manner. The use of shape classes and composite shape classes to build process graphic displays in a modular, extensible fashion provides further flexibility to the configuration engineer. With instances of such composite shapes in displays associated, or linked, with the library objects (e.g., composite shape classes) from which they were instantiated, automatic propagation of updates may occur through a single change to the library class. These are but a few of the benefits supported by XML-based process graphics descriptions and the parameterization of such descriptions (i.e., the separation of graphic structure definitions and graphic parameters).

As described herein above, the creation of each process graphic display, and graphic display element contained therein, is recorded in a respective textual description set forth in a first declarative format. Script commands in each description provide an efficient, non-memory intensive mechanism for defining the displays, despite the complexity of the graphics to be rendered. The declarative format and, therefore, the script commands, may be based on any one of a number of different markup languages. More particularly, a markup language based on XML may be relied upon to set forth a rendering definition, or XML blob, for each display and display element. To support advanced graphics, such as animation, the markup language may also define such graphics in accordance with a vector graphics scheme.

As further described herein above, the dynamic nature of the process graphics is designed to reflect current values of process plant parameters as on-line or simulation conditions change. To this end, the process graphics may be linked to sources for the data reflecting such changes. Each XML-based description may accordingly include one or more data source references that generally identify a data source location for each respective dynamic graphic parameter (e.g., a tank interior's changing color) to be modified in accordance with the data. The data source location may also be left open for later specification during configuration via the editors, such that the script identifies an alias or placeholder to refer to the data source or path information to be specified later. Because the data source information and other characteristics of the process graphic displays (e.g., behaviors such as event handling) are specified via the XML-based description, the XML-based language may be referred to as PGXML, or process graphics XML.

Upon finishing the configuration and design work toward defining a process graphic display and its constituent elements, the configuration engineer or other user may elect to process the PGXML description in preparation for downloading the process graphics to the operator workstations or other user display devices. Generally speaking, each PGXML description of the process graphic displays and graphic display elements is processed to generate (i) script in a vector graphics format compatible with a graphics rendering engine to be used, and (ii) code having instructions specifying the data source references and any other non-graphics functionality (e.g., behaviors) of the display. The vector graphics format of the script may also be a declarative, or XML-based language. In embodiments utilizing a Microsoft Avalon user interface architecture, the vector graphics script may be set forth in Microsoft XAML (Extensible Application Markup Language). Other embodiments may utilize other formats, such as the open source format SVG (Scalable Vector Graphics). The capability to use any of the available vector graphics architectures is made possible because the PGXML descriptions are set forth in a separate format outside of the format or object model directly used in rendering the graphics structures. The code may be set forth in C# or any other suitable programming language, as desired.

In some embodiments, the vector graphics script and associated code are then combined and compiled into files that set forth executable commands for the operator workstation or other user display device. To this end, a respective dynamic-link library (DLL) file may be created for each process graphic display and graphic display element. In any event, such compilation of the vector graphics script and associated code may be performed prior to downloading to minimize network data transmission requirements.

The foregoing exemplary portions of the object model framework represent but a few of the numerous classes defined to support the process graphics and other functionality of the user interface system.

When implemented, any of the software described herein may be stored in any computer readable memory such as on a magnetic disk, a laser disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it may be apparent to those of ordinary skill in the art that changes, additions or deletions may be made to the disclosed embodiments without departing from the spirit and scope of the invention.

The invention claimed is:

1. An object entity stored in a non-transitory computer-readable storage medium within an object oriented programming environment for programming functionality for use with a user interface system for a process control system, the object entity comprising:
   a first portion defining graphics for a depiction of a process plant element of the process control system via the user interface;
   a second portion identifying a data source for data indicative of on-line operation of the process plant element to be displayed via the depiction wherein data indicative of the online operation of the process plant element is retrieved from the data source when the graphics for the depiction of the process plant element are rendered for display via the user interface so that the depiction of the process plant element is displayed via the user interface in a manner indicative of the on-line operation of the process plant element; and
a third portion defining a method to be implemented to simulate on-line operation of the process plant element;
wherein the first portion is set forth in a declarative format; and
wherein the object entity within the object oriented programming environment operates to depict both on-line and simulation operation of the process plant element that includes displaying data calculated from the simulation via the depiction when the graphics for the depiction of the process plant element are rendered for display via the user interface.

2. The object entity of claim 1, wherein the first portion defines an instance of a shape object utilized in rendering the depiction.

3. The object entity of claim 1, wherein the first portion defines an instance of a composite shape object utilized in rendering the depiction.

4. The object entity of claim 1, wherein the declarative format is in accordance with an extensible markup language.

5. The object entity of claim 1, wherein the declarative format comprises a vector graphics format for script defining the graphics.

6. The object entity of claim 1, wherein the first portion further defines a data conversion parameter to specify a graphical depiction of the data indicative of on-line operation of the process plant element.

7. The object entity of claim 1, wherein the graphics include animated elements having animation indicative of the on-line operation of the process plant element.

8. The object entity of claim 1, wherein the declarative format is converted into a vector graphics format for rendering the depiction of the process plant element.

9. The object entity of claim 1, wherein the third portion further defines one or more methods to be implemented to depict both on-line and simulation operation of the process plant element.

10. A user interface system for a process control system, comprising:
a computer processor;
a computer-readable storage medium having instructions stored thereon which, when executed by the computer processor provide:
a graphic display editor to configure a process graphic display having a graphic display element representative of a process plant element of the process control system, wherein the process plant element corresponds to an object entity within an object oriented programming environment that includes the graphic display element, and wherein configuration information for the process graphic display generated by the graphic display editor is stored in the computer-readable medium in accordance with a declarative language, the object entity including the configuration information;
a conversion engine for generating commands in accordance with a further declarative language different from the declarative language based on graphics related information of the configuration information and for generating a data source reference file from the configuration information for the process graphic display that identifies a data source for data to be displayed in connection with the graphic display element, and generating commands specifying a data conversion routine for the graphic display element for converting data values from the data source to graphically and dynamically display the data from the data source in association with the display of the graphics display element and to simulate on-line operation of the process plant element, wherein the process graphic display operates to depict both on-line and simulation operation of the process plant element that includes displaying data calculated from the simulation of the process plant element via the graphic display element; and
a graphics rendering engine to generate a depiction of the process graphic display during runtime based on commands derived from the configuration information.

11. The user interface system of claim 10, wherein the configuration information is stored in accordance with an object model framework based on the declarative language.

12. The user interface system of claim 11, wherein the object model framework defines primitive shape objects made available by the graphic display editor to configure the process graphic display to include an additional graphic display element constructed from the primitive shape objects.

13. The user interface system of claim 11, wherein the object model framework defines a composite object made available by the graphic display editor to configure the process graphic display to include an additional graphic display element constructed from the composite object.

14. The user interface system of claim 11, wherein the graphic display editor comprises graphical editing tools to create the composite object from previously constructed process model objects stored in the computer-readable medium.

15. The user interface system of claim 14, wherein the graphical editing tools are defined via the object model framework.

16. The user interface system of claim 10, wherein the declarative language is an extensible markup language.

17. The user interface system of claim 10, wherein the declarative language defines an XML-based format for describing the configuration information.

18. The user interface system of claim 10, wherein the further declarative language sets forth the graphics-related language in accordance with a vector graphics format.

19. The user interface system of claim 10, wherein the declarative language defines an extensible format for expressing the configuration information.

20. A method of configuring a user interface system for a process control system, comprising:
using an object representing a physical process plant element in the process control system and defining a composite graphical element that depicts the physical process plant element of the process control system to create a plurality of instances thereof in respective process graphic displays to be depicted via the user interface;
storing data in a computer-readable medium of the user interface system defining the plurality of instances of the composite graphical element;
modifying the object defining the composite graphical element;
propagating the modification to each of the plurality of instances of the composite graphical element; and
automatically updating each of the plurality of instances of the composite graphical element to reflect the modification.

21. The method of claim 20, wherein the object comprises a definition set forth in an XML-based graphics language.

22. An object entity stored in a non-transitory computer-readable storage medium within an object oriented programming environment for programming functionality for use with a user interface system for a process control system, the object entity comprising:
   a graphics portion defining graphics for a depiction of a process element via the user interface;
   a parameters portion identifying configurable aspects of the graphics; and
   a navigation portion identifying data sources for content to be displayed in connection with the graphics; and
   a simulation portion defining a method to be implemented to simulate the on-line operation of the process element;
   wherein the graphics portion, the parameters portion, the navigation portion, and the simulation portion are stored in the computer-readable medium discretely; and
   wherein the object entity within the object oriented programming environment operates to depict both on-line and simulation operation of the process element that includes displaying data calculated from the simulation via the depiction of the process element in connection with the graphics.

23. The object entity of claim 22, wherein the computer-readable medium comprises a plurality of memory storage devices, such that the graphics portion, the parameters portion, the navigation portion, and the simulation portion are not stored on a single memory storage device.

24. The object entity of claim 22, wherein the graphics portion comprises a description in an XML-based graphics language.

* * * * *